(12) United States Patent
Modarres Razavi et al.

(10) Patent No.: US 11,553,299 B2
(45) Date of Patent: Jan. 10, 2023

(54) FIRST NETWORK NODE, SECOND NETWORK NODE, WIRELESS DEVICE AND METHODS THEREIN FOR HANDLING BROADCAST INFORMATION

(71) Applicant: Telefonaktiebolaget LM Ericsson (publ), Stockholm (SE)

(72) Inventors: Sara Modarres Razavi, Linköping (SE); Åke Busin, Sollentuna (SE); Fredrik Gunnarsson, Linköping (SE); Karl Norrman, Stockholm (SE); Henrik Rydén, Solna (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 544 days.

(21) Appl. No.: 16/610,632

(22) PCT Filed: Apr. 30, 2018

(86) PCT No.: PCT/SE2018/050442
§ 371 (c)(1),
(2) Date: Nov. 4, 2019

(87) PCT Pub. No.: WO2018/203806
PCT Pub. Date: Nov. 8, 2018

(65) Prior Publication Data
US 2021/0050925 A1 Feb. 18, 2021

Related U.S. Application Data

(60) Provisional application No. 62/502,143, filed on May 5, 2017.

(51) Int. Cl.
*H04L 29/00* (2006.01)
*H04W 4/02* (2018.01)
(Continued)

(52) U.S. Cl.
CPC .............. *H04W 4/02* (2013.01); *H04H 60/06* (2013.01); *H04L 63/0428* (2013.01);
(Continued)

(58) Field of Classification Search
CPC .............. H04W 4/02; H04W 12/0433; H04W 12/0431; H04W 12/0471; H04W 12/041;
(Continued)

(56) References Cited

U.S. PATENT DOCUMENTS 8,280,057 B2 * 10/2012 Budampati ......... H04W 12/069
380/37
2011/0032859 A1 2/2011 Wirola et al.
(Continued)

FOREIGN PATENT DOCUMENTS

CN 101415187 A 4/2009
CN 101969597 A 2/2011
(Continued)

OTHER PUBLICATIONS

Unknown, Author, "3rd Generation Partnership Project; Technical Specification Group Services and System Aspects; 3GPP System Architecture Evolution (SAE); Security architecture (Release 14)", 3GPP TS 33.401 V14.0.0, Sep. 2016, pp. 1-152.
(Continued)

*Primary Examiner* — Brandon Hoffman
*Assistant Examiner* — Michael D Anderson
(74) *Attorney, Agent, or Firm* — Christopher & Weisberg, P.A.

(57) ABSTRACT

A method for handling broadcast information is described. A first network node (111) operating in a wireless communications network (100) determines (403) one or more decryption keys (K1, K2, K3) to be provided to a wireless device (131) in the wireless communications network (100). The decryption keys enable the wireless device (131) to decrypt
(Continued)

information to be broadcasted by a second network node (112) in the wireless communications network (100). The information comprises a plurality of subsets of positioning information. Each of the subsets is to be, or is, encrypted with a different encryption key based on a respective type of subscription for wireless devices (131, 132, 133) in the wireless communications network (100). The determined decryption keys are based on at least one type of subscription of the wireless device (131). The first network node (111) then initiates (404) providing the determined to the wireless device (131).

16 Claims, 13 Drawing Sheets

(51) Int. Cl.
*H04W 12/02* (2009.01)
*H04W 12/08* (2021.01)
*H04W 12/033* (2021.01)
*H04W 12/041* (2021.01)
*H04W 12/0431* (2021.01)
*H04W 12/0433* (2021.01)
*H04W 12/0471* (2021.01)
*H04H 60/06* (2008.01)
*H04L 9/40* (2022.01)
*H04W 24/10* (2009.01)
*H04W 64/00* (2009.01)

(52) U.S. Cl.
CPC ......... *H04W 12/02* (2013.01); *H04W 12/033* (2021.01); *H04W 12/041* (2021.01); *H04W 12/0431* (2021.01); *H04W 12/0433* (2021.01); *H04W 12/0471* (2021.01); *H04W 12/08* (2013.01); *H04W 24/10* (2013.01); *H04W 64/003* (2013.01)

(58) Field of Classification Search
CPC ... H04W 12/033; H04W 12/02; H04W 12/08; H04W 24/10; H04W 64/003; H04H 60/06; H04L 63/0428

USPC ........................................................ 380/277
See application file for complete search history.

(56) References Cited

U.S. PATENT DOCUMENTS

2013/0152208 A1  6/2013  King et al.
2013/0324154 A1  12/2013 Raghupathy et al.
2016/0029162 A1  1/2016  Edge et al.

FOREIGN PATENT DOCUMENTS

CN          102324994 A      1/2012
CN          103765927 A      4/2014
WO       WO-2014046758 A1 *  3/2014   ........... G01S 5/0054

OTHER PUBLICATIONS

Unknown, Author, "3rd Generation Partnership Project; Technical Specification Group Services and System Aspects; Functional stage 2 description of location services in UMTS (Release 1999)", 3GPP TS 23.171 V3.11.0, Mar. 2004, pp. 1-53.

Unknown, Author, "3rd Generation Partnership Project; Technical Specification Group Services and System Aspects; Generic Authentication Architecture (GAA); Generic Bootstrapping Architecture (GBA) (Release 14)", 3GPP TS 33.220 V14.0.0, Dec. 2016, pp. 1-93.

Unknown, Author, "3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 14)", 3GPP TS 36.305 V14.1.0, Mar. 2017, pp. 1-78.

Unknown, Author, "3rd Generation Partnership Project; Technical Specification Group Radio Access Network; Stage 2 functional specification of User Equipment (UE) positioning in UTRAN (Release 14)", 3GPP TS 25.305 V14.0.0, Mar. 2017, pp. 1-95.

Unknown, Author, "New WID: UE Positioning Accuracy Enhancements for LTE", 3GPP TSG RAN Meeting #75, RP-170813, Dubrovnik, Croatia, Mar. 6-9, 2017, pp. 1-4.

Chinese Office Action and Search Report with English Machine Translation dated Jul. 20, 2021 for Patent Application No. 201880044534.0 consisting of 28-pages.

* cited by examiner

| 910 | The network node receives the positioning information container from the location server. |

| 920 | The network node broadcasts the positioning information. |

Figure 9

| 1010 | The location server receives positioning reference information from some other unit (e.g. RTK network). |

| 1020 | The location server prepares a positioning broadcast information container for each relevant network node (i.e. base station). |

| 1030 | The location server encrypts part or all of the positioning broadcast information in each container. |

| 1040 | The location server sends the encrypted positioning broadcast information to each relevant network node. |

Figure 10

FIRST NETWORK NODE, SECOND NETWORK NODE, WIRELESS DEVICE AND METHODS THEREIN FOR HANDLING BROADCAST INFORMATION

TECHNICAL FIELD

The present disclosure relates generally to a first network node and methods performed thereby for handling broadcast information. The present disclosure also relates generally to a second network node, and methods performed thereby for handling broadcast information. The present disclosure also relates generally to a wireless device, and methods performed thereby for handling broadcast information.

BACKGROUND

Wireless devices within a wireless communications network may be e.g., User Equipments (UE), stations (STAs), mobile terminals, wireless terminals, terminals, and/or Mobile Stations (MS). Wireless devices are enabled to communicate wirelessly in a cellular communications network or wireless communication network, sometimes also referred to as a cellular radio system, cellular system, or cellular network. The communication may be performed e.g., between two wireless devices, between a wireless device and a regular telephone and/or between a wireless device and a server via a Radio Access Network (RAN) and possibly one or more core networks, comprised within the wireless communications network. Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

The wireless communications network covers a geographical area which may be divided into cell areas, each cell area being served by a network node, which may be an access node such as a radio network node, radio node or a base station, e.g., a Radio Base Station (RBS), which sometimes may be referred to as e.g., evolved Node B ("eNB"), "eNodeB", "NodeB", "B node", gNB, Transmission Point (TP), or BTS (Base Transceiver Station), depending on the technology and terminology used. The base stations may be of different classes such as e.g., Wide Area Base Stations, Medium Range Base Stations, Local Area Base Stations, Home Base Stations, pico base stations, etc. . . . , based on transmission power and thereby also cell size. A cell is the geographical area where radio coverage is provided by the base station or radio node at a base station site, or radio node site, respectively. One base station, situated on the base station site, may serve one or several cells. Further, each base station may support one or several communication technologies. The base stations communicate over the air interface operating on radio frequencies with the terminals within range of the base stations. The wireless communications network may also be a non-cellular system, comprising network nodes which may serve receiving nodes, such as wireless devices, with serving beams. In 3rd Generation Partnership Project (3GPP) Long Term Evolution (LTE), base stations, which may be referred to as eNodeBs or even eNBs, may be directly connected to one or more core networks. In the context of this disclosure, the expression Downlink (DL) may be used for the transmission path from the base station to the wireless device. The expression Uplink (UL) may be used for the transmission path in the opposite direction i.e., from the wireless device to the base station.

Positioning

UE positioning is recognized as an important feature for LTE networks due to its potential for massive user applications, for example, intelligent transportation, entertainment, industry automation, robotics, remote operation, healthcare, smart parking and so on, as well as its relevance to the United States Federal Communications Commission (US FCC) E911 requirements.

Positioning in LTE may be supported by the architecture in shown in FIG. 1, with direct interactions between a UE 10 and a location server, the Evolved Serving Mobile Location Center (E-SMLC) 11, via the LTE Positioning Protocol (LPP) 12. Moreover, there may be also interactions between the location server and the eNodeB 13 via the LTE Positioning Protocol A (LPPa) 14, to some extent supported by interactions between the eNodeB 13 and the UE 10 via the Radio Resource Control (RRC) protocol 15. The eNodeB 40 and the E-SMLC 20 may also communicate with a Mobility Management Entity (MME) 16, which in turn communicates with a Gateway Mobile Location Centre (GMLC) 17.

In LTE, as described e.g., in 3GPP Technical Specification 36.305, v. 14.1.0, several positioning techniques may be considered. A first technique is the Enhanced Cell Identifier (ID). Through this technique, cell ID information may be used to associate the UE to the serving area of a serving cell, and then additional information may be used to determine a finer granularity position.

Another technique is assisted Global Navigation Satellite System (GNSS). GNSS may be understood to encompass all systems that may provide worldwide positioning based on satellites, including, for example, the Global Positioning System (GPS), the Global Navigation Satellite System (GLONASS) and Galileo. In this technique, GNSS information may be retrieved by the UE, and it may be supported by assistance information provided to the UE from the E-SMLC.

Another technique is the Observed Time Difference of Arrival (OTDOA). In this technique, the UE may estimate the time difference of reference signals from different base stations and may send the result of the estimation to the Evolved Serving Mobile Location Center (E-SMLC) for multilateration.

Yet another technique is the Uplink TDOA (UTDOA). In this technique, the UE may be requested to transmit a specific waveform that may be detected by multiple location measurement units, e.g. an eNB, at known positions. These measurements may be forwarded to the E-SMLC for multilateration.

The positioning techniques may be supported by assistance data from the location server to the UE. FIG. 2 is a schematic diagram illustrating an LPP Assistance Data Transfer procedure. Typically, the UE, which may be considered a target device 20, may either request assistance data at 22 and the location server 21 provide assistance data at 23, or the location server 21 may provide assistance data unsolicited at 24, as illustrated by FIG. 2.

Recent enhancements in GNSS technology include support for very precise positioning, where the device, e.g., a UE, may interact with a network node to obtain specific measurement correction information. Much of these enhancements are captured by the specification work of Radio Technical Commission for Maritime Services (RTCM), 3GPP TS 25.305, v. 14.0.0, "Stage 2 functional specification of User Equipment (UE) positioning in UTRAN". One example is Real Time Kinematics (RTK) GNSS, which is a differential GNSS positioning technology enabling positioning accuracy improvement from meter level to decimetre, or even centimetre level in the right conditions, in real-time by exploiting the carrier phase of the GNSS signal rather than only the code phase. Support for RTK GNSS in LTE networks may therefore be provided and are under standardization in the Release 15 work item. The support for RTK in LTE networks comprises reporting RTK correction data to the UE. Two versions of reporting RTK data to the UE are currently under discussion, the first known method is to broadcast the information from base stations by extending the system information bits. The other method is to send the information to each UE individually, for example via LPP. In addition, the UE may also interact with an RTK server over the application layer directly.

Further, as the number of UEs supporting network-assisted positioning increases, broadcasting of assistance data to the UEs may help to reduce signaling load, as well as supporting geofencing of broadcast warning messages for example. Existing methods to provide network-assisted positioning information lack efficiency and waste network resources, increasing its latency, and decreasing its capacity.

SUMMARY

It is an object of embodiments herein to improve the handling of broadcast information in a wireless communications network. It is a particular object of embodiments herein to improve the handling of broadcast information comprising positioning information in a wireless communications network.

According to a first aspect of embodiments herein, the object is achieved by a method, performed by a first network node. The method is for handling broadcast information. The network node operates in a wireless communications network. The first network node determines one or more decryption keys to be provided to a wireless device operating in the wireless communications network. The one or more decryption keys enable the wireless device to decrypt information to be broadcasted by a second network node operating in the wireless communications network. The information comprises a plurality of subsets of positioning information. Each of the subsets of positioning information is to be, or is, encrypted with a different encryption key based on a respective type of subscription of a plurality of types of subscription for wireless devices in the wireless communications network. The determined one or more decryption keys are based on at least one type of subscription of the wireless device from the plurality of types of subscription. The first network node then initiates providing the determined one or more decryption keys to the wireless device.

According to a second aspect of embodiments herein, the object is achieved by a method, performed by the wireless device. The method is for handling broadcast information. The wireless device operates in the wireless communications network. The wireless device obtains, from the first network node operating in the wireless communications network, the one or more decryption keys enabling the wireless device to decrypt the information to be broadcasted by the second network node. The second network node operates in the wireless communications network. The information comprises the plurality of subsets of positioning information. Each of the subsets of positioning information is to be, or is, encrypted with a different encryption key based on the respective type of subscription of the plurality of types of subscription for wireless devices in the wireless communications network. The obtained one or more decryption keys are based on at least one type of subscription of the wireless device from the plurality of types of subscription. The wireless device then decodes the information, broadcasted by the second network node, based on the obtained one or more decryption keys.

According to a third aspect of embodiments herein, the object is achieved by a method performed by the second network node. The method is for broadcasting the information. The second network node operates in the wireless communications network. The second network node obtains, from the first network node operating in the wireless communications network, the information to be broadcasted by the second network node to the wireless device operating in the wireless communications network. The information comprises the plurality of subsets of positioning information. Each of the subsets of positioning information is to be, or is, encrypted with a different encryption key based on the respective type of subscription of the plurality of types of subscription for wireless devices in the wireless communications network. Each of the encrypted subsets of positioning information is enabled to be decrypted with the one or more decryption keys based on at least the one type of subscription of the wireless device from the plurality of types of subscription. The second network node then broadcasts the obtained information.

According to a fourth aspect of embodiments herein, the object is achieved by the first network node, configured to handle the broadcast information. The network node is configured to operate in the wireless communications network. The first network node is further configured to determine the one or more decryption keys configured to be provided to the wireless device configured to operate in the wireless communications network. The one or more decryption keys are configured to enable the wireless device to decrypt the information configured to be broadcasted by the second network node configured to operate in the wireless communications network. The information is configured to comprise the plurality of subsets of positioning information. Each of the subsets of positioning information is configured to be encrypted with a different encryption key based on the respective type of subscription of the plurality of types of subscription for wireless devices in the wireless communications network. The one or more decryption keys configured to be determined are configured to be based on at least the one type of subscription of the wireless device from the plurality of types of subscription. The first network node is also configured to initiate providing the one or more decryption keys configured to be determined to the wireless device.

According to a fifth aspect of embodiments herein, the object is achieved by the wireless device, configured to handle the broadcast information. The wireless device is configured to operate in the wireless communications network. The wireless device is further configured to obtain, from the first network node configured to operate in the wireless communications network, the one or more decryption keys configured to enable the wireless device to decrypt information configured to be broadcasted by the second network node configured to operate in the wireless communications network. The information is configured to comprise the plurality of subsets of positioning information. Each of the subsets of positioning information is configured to be encrypted with a different encryption key based on the respective type of subscription of the plurality of types of subscription for wireless devices in the wireless communications network. The one or more decryption keys configured to be obtained are configured to be based on at least the one type of subscription of the wireless device from the plurality of types of subscription. The wireless device is further configured to decode the information, configured to be broadcasted by the second network node, based on the one or more decryption keys configured to be obtained.

According to a sixth aspect of embodiments herein, the object is achieved by the second network node, configured to broadcast information. The second network node is configured to operate in the wireless communications network. The second network node is further configured to obtain, from the first network node configured to operate in the wireless communications network, the information configured to be broadcasted by the second network node to the wireless device configured to operate in the wireless communications network. The information is configured to comprise the plurality of subsets of positioning information. Each of the subsets of positioning information is configured to be encrypted with a different encryption key based on the respective type of subscription of the plurality of types of subscription for wireless devices in the wireless communications network. Each of the encrypted subsets of positioning information, is configured to be enabled to be decrypted with the one or more decryption keys based on at least the one type of subscription of the wireless device from the plurality of types of subscription. The second network node is further configured to broadcast the information configured to be obtained.

By the first network node determining the one or more decryption keys, it is possible to control the access of different wireless devices in using the broadcast data. This may be facilitated by the second network node broadcasting the encrypted data, and the wireless device decoding the data according to the one or more decryption keys.

BRIEF DESCRIPTION OF THE DRAWINGS

Examples of embodiments herein are described in more detail with reference to the accompanying drawings, according to the following description.

FIG. 9 is a flowchart depicting a non-limiting example of a method in a second network node, according to embodiments herein.

FIG. 10 is a flowchart depicting a non-limiting example of a method in a communications system, according to embodiments herein.

DETAILED DESCRIPTION

Terminology

Figure 1:
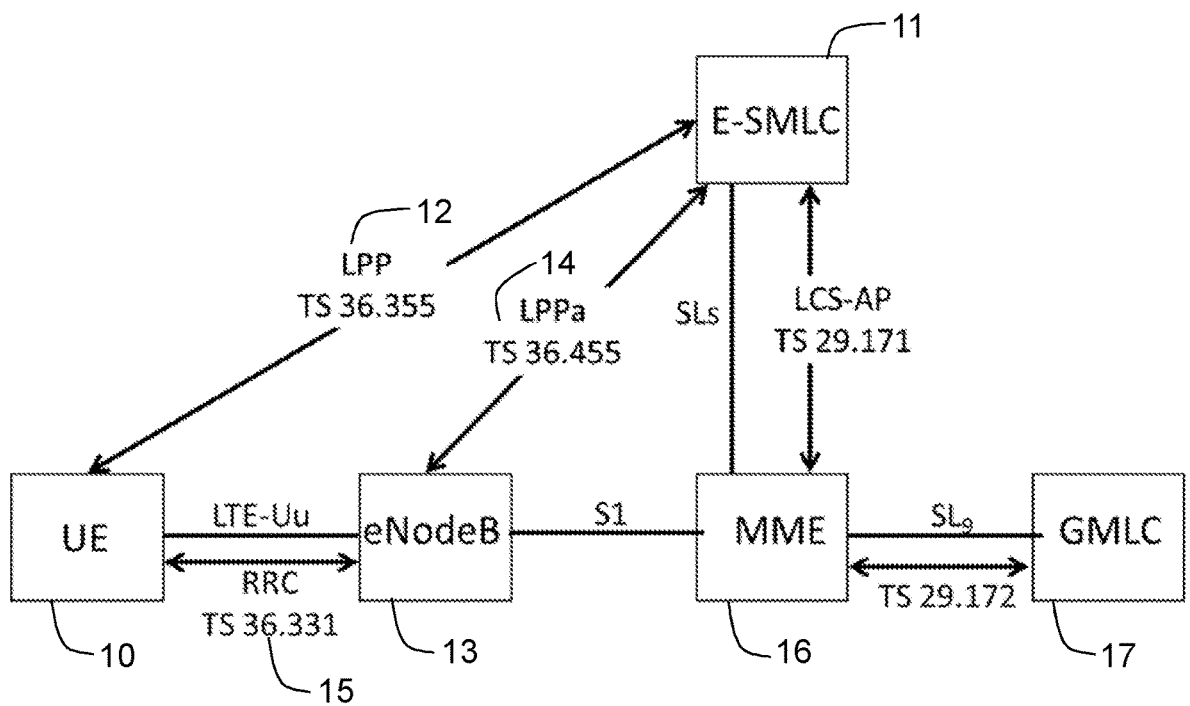
FIG. 1 is a schematic diagram illustrating an LTE positioning architecture.
Figure 2:
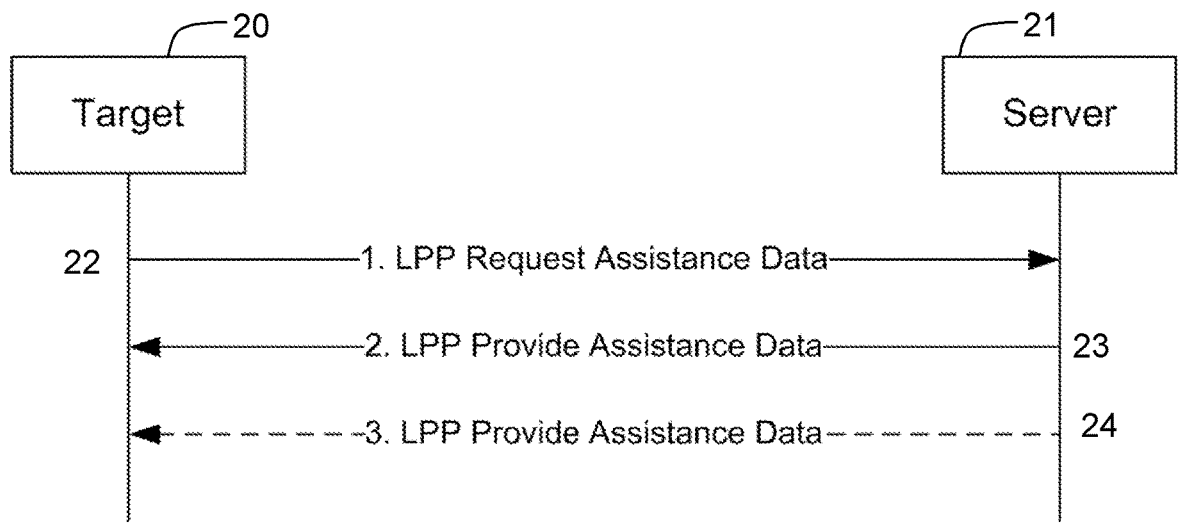
FIG. 2 is a schematic diagram illustrating an LPP Assistance Data Transfer procedure.

The following commonly terminologies are used in the embodiments and are elaborated below:

Network node: In some embodiments generic terminology "network node", is used. It may be any kind of network node, which may comprise a radio network node such as base station, radio base station, base transceiver station, base station controller, network controller, multi-standard radio BS, gNB, New Radio (NR) BS, evolved Node B (eNB), Node B, Multi-cell/multicast Coordination Entity (MCE), relay node, access point, radio access point, Remote Radio Unit (RRU), Remote Radio Head (RRH), a multi-standard BS, a.k.a. MSR BS, a core network node, e.g., MME, Self Organizing Network (SON) node, a coordinating node, positioning node, Minimization of Drive Test (MDT) node, etc . . . , or even an external node, e.g., 3rd party node, a node external to the current network, etc. The network node may also comprise a test equipment.

Radio network node: In some embodiments, the non-limiting term radio network node is more commonly used, and it refers to any type of network node serving a UE and/or connected to other network node or network element or any radio node from where a UE may receive signal. Examples of radio network nodes are Node B, base station (BS), multi-standard radio (MSR) radio node, such as MSR BS, eNode B, network controller, radio network controller (RNC), base station controller (BSC), relay, donor node controlling relay, base transceiver station (BTS), access point (AP), transmission points (TP), transmission nodes, RRU, RRH, nodes in distributed antenna system (DAS) etc.

User equipment: In some embodiments, the non-limiting term user equipment (UE) is used and it refers to any type of wireless device communicating with a radio network node in a cellular or mobile communication system. Examples of UE are target device, device to device UE, machine type UE or UE capable of machine to machine communication, PDA, iPad, Tablet, mobile terminal, smart phone, laptop embedded equipped (LEE), laptop mounted equipment (LME), USB dongles, Customer Premises Equipment (CPE), etc.

As part of developing embodiments herein, one or more problems that may be associated with the use of at least some of the existing methods, and that may addressed by embodiments herein, will first be identified and discussed.

In the current Rel.15 Work Item (WI) on UE Positioning Accuracy Enhancements for LTE (RP-170813), one objective is to broadcast the assistance data that may be required for different positioning methods including OTDOA, Assisted-GNSS (A-GNSS) and RTK. There are several issues with broadcasting these information. Some parameters, such as eNB coordinates, are considered to be sensitive information for the network, and sharing this information is not favorable. There may need to be some categorization for the UEs accessing this information, otherwise broadcasting may not be secure.

Embodiments herein address the problems of the existing solutions. Embodiments herein may be understood to relate to providing an encryption functionality for the broadcasted positioning assistance information.

Embodiments will now be described more fully hereinafter with reference to the accompanying drawings, in which examples are shown. In this section, the embodiments herein will be illustrated in more detail by a number of exemplary embodiments. It should be noted that the exemplary embodiments herein are not mutually exclusive. Components from one embodiment may be tacitly assumed to be present in another embodiment and it will be obvious to a person skilled in the art how those components may be used in the other exemplary embodiments.

Note that although terminology from 3GPP LTE has been used in this disclosure to exemplify the embodiments herein, this should not be seen as limiting the scope of the embodiments herein to only the aforementioned system. Other wireless systems, including NR, Wideband Code Division Multiple Access (WCDMA), Worldwide Interoperability for Microwave Access (WiMax), Ultra-Mobile Broadband (UMB) and Global System for Mobile communications (GSM), may also benefit from exploiting the ideas covered within this disclosure.

Figure 3:
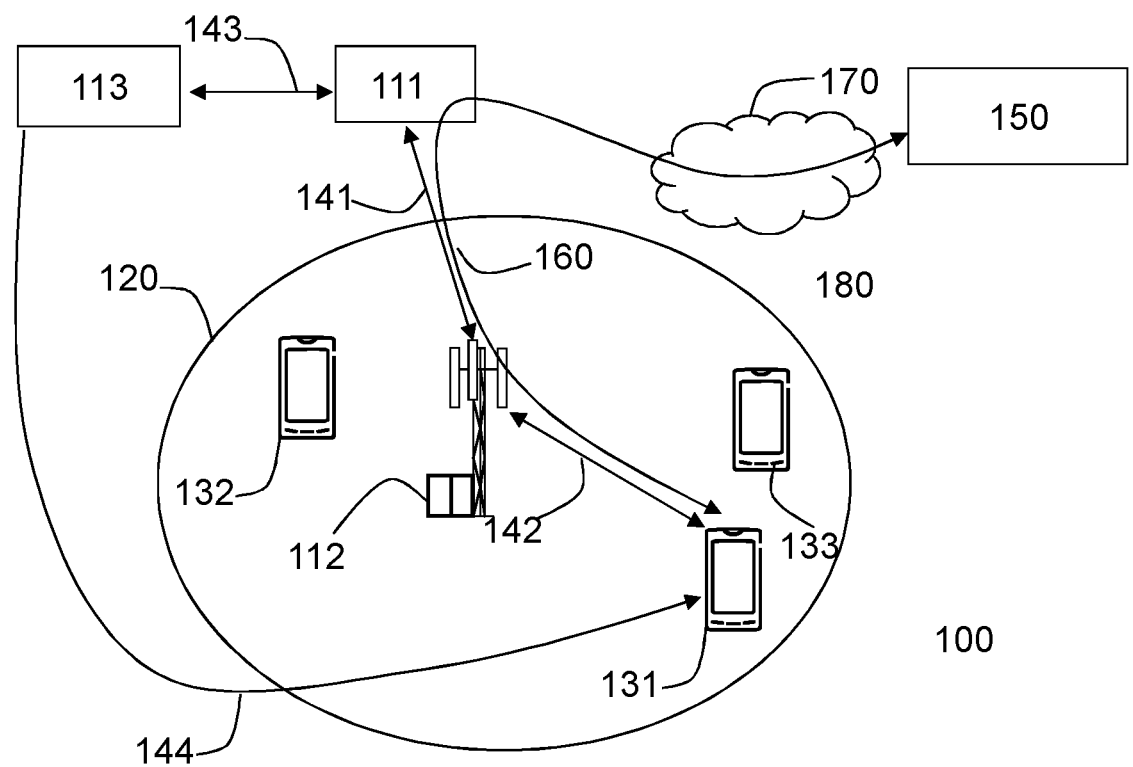
FIG. 3 is a schematic diagram illustrating embodiments of a wireless communications network, according to embodiments herein.

FIG. 3 depicts an example of a wireless communications network 100, sometimes also referred to as a cellular radio system, cellular network or wireless communications system, in which embodiments herein may be implemented. The wireless communications network 100 may for example be a network such as a Long-Term Evolution (LTE), e.g., LTE Frequency Division Duplex (FDD), LTE Time Division Duplex (TDD), LTE Half-Duplex Frequency Division Duplex (HD-FDD), LTE operating in an unlicensed band, Wideband Code Division Multiple Access (WCDMA), Universal Terrestrial Radio Access (UTRA) TDD, Global System for Mobile communications (GSM) network, GSM/Enhanced Data Rate for GSM Evolution (EDGE) Radio Access Network (GERAN) network, Ultra-Mobile Broadband (UMB), EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, WiFi networks, Worldwide Interoperability for Microwave Access (WiMax), a 5G system, 5G network, NR or Next Gen System or network or any cellular network or system. Thus, although terminology from 3GPP LTE may be used in this disclosure to exemplify embodiments herein, this should not be seen as limiting the scope of the embodiments herein to only the aforementioned system.

The wireless communications network 100 comprises a plurality of network nodes whereof a first network node 111, a second network node 112 and a third network node 113 are depicted in FIG. 3.

Each of the first network node 111 and the third network node 113 is a network node that has a capability to perform location services. Each of the first network node 111 and the third network node 113 may perform their location services with different technologies. In a typical example, the first network node 111 may be a location server, such as an E-SMLC in LTE. Also in a typical example, the third network node 133 may be an RTK GNSS server or an MME.

Each of the first network node 111 and the third network node 113 may be connected to different core networks and be operated by the same or different operators.

The second network node 112 may typically be a radio network node. In fact, in some embodiments, any of the first network node 111, the second network node 112, and the third network node 113 may be a radio network node such as e.g., a base station, an eNB, eNodeB, or a Home Node B, a Home eNodeB, femto Base Station, BS, a Transmission Point (TP), Radio Access Point, Remote Radio Unit (RRU), Remote Radio Head (RRH), or any other network unit capable to serve a wireless device or a machine type node in the wireless communications network 100. In such embodiments, any of the first network node 111, the second network node 112, and the third network node 113 may be e.g., a Wide Area Base Station, Medium Range Base Station, Local Area Base Station and Home Base Station, based on transmission power and thereby also coverage size. Any of the first network node 111, the second network node 112, and the third network node 113 may be a stationary relay node or a mobile relay node. Any of the first network node 111, the second network node 112, and the third network node 113 may support one or several communication technologies, and its name may depend on the technology and terminology used. In some non-limiting examples, any of the first network node 111, the second network node 112, and the third network node 113 may serve receiving nodes with serving beam-formed beams, which may also be referred to herein simply as beams. In some embodiments, any of the first network node 111, the second network node 112, and the third network node 113 may correspond to any type of radio network node or any network node, which communicates with another radio network node or wireless device. Any of the first network node 111, the second network node 112, and the third network node 113 may be directly connected to one or more networks and/or one or more core networks.

Any of the first network node 111, the second network node 112 and the third network node 113 may be implemented as one or more distributed nodes, one or more of which may be a virtual nodes in the cloud. In some examples, any of the first network node 111, the second network node 112, and the third network node 113 may be co-localized, partly co-localized, or be the same network node.

The wireless communications network 100 comprises a first wireless device 131, which may be also referred to herein as the wireless device 131. The wireless communications network 100 may also comprise a plurality of wireless devices comprising the first wireless device 131. In the non-limiting example scenario of FIG. 3, the plurality of wireless devices may comprise a second wireless device 132 and a third wireless device 133, although this is just for illustrative purposes and the number of wireless devices in the plurality may vary. Any of the first wireless device 131, the second wireless device 132 and the third wireless device 133, or any other wireless device in the plurality of wireless devices may be also known as e.g., a UE, mobile terminal, wireless terminal and/or mobile station, mobile telephone, cellular telephone, or laptop with wireless capability, or a Customer Premises Equipment (CPE), just to mention some further examples. Any of the first wireless device 131, the second wireless device 132 and the third wireless device 133, or any other wireless device in the plurality of wireless devices in the present context may be, for example, portable, pocket-storable, hand-held, computer-comprised, or a vehicle-mounted mobile device, enabled to communicate voice and/or data, via a RAN, with another entity, such as a server, a laptop, a Personal Digital Assistant (PDA), or a tablet computer, sometimes referred to as a tablet with wireless capability, or simply tablet, a Machine-to-Machine (M2M) device, a device equipped with a wireless interface, such as a printer or a file storage device, modem, Laptop Embedded Equipped (LEE), Laptop Mounted Equipment (LME), USB dongles, CPE or any other radio network unit capable of communicating over a radio link in the wireless communications network 100. Any of the first wireless device 131, the second wireless device 132 and the third wireless device 133, or any other wireless device in the plurality of wireless devices may be wireless, i.e., it may be enabled to communicate wirelessly in the wireless communication network 100 and, in some particular examples, may be able support beamforming transmission. The communication may be performed e.g., between two devices, between a device and a network node, and/or between a device and a server. The communication may be performed e.g., via a RAN and possibly one or more core networks, comprised within the wireless communications network 100. In a typical scenario, the second network node 112 may be a base station serving the wireless device 131, as depicted in FIG. 3.

The first network node 111 may communicate with the second network node 112 over a first link 141, e.g., a radio link. The second network node 112 may communicate with the wireless device 131 over a second link 142, e.g., a radio link. The first network node 111 may communicate with the third network node 113 over a third link 143, e.g., a radio link or a wired link. The third network node 113 may communicate with the wireless device 131 directly over a fourth link 144, e.g., a radio link. Each of the first link 141, the second link 142, the third link 143 and the fourth link 144 may be a direct link or a comprise one or more links, e.g., via one or more other network nodes, radio network nodes or core network nodes.

Each of the second wireless device 132, the third wireless device 133, or any other wireless device in the plurality of wireless devices may connect to any of the first network node 111, the second network node 112, and the third network node 113 with similar links to those described for the wireless device 131. These are not depicted in the Figure to simplify it.

In some embodiments, the wireless communications network 100 may be connected to a host computer 150, which is depicted in the example of FIG. 3. The host computer 150 may be embodied in the hardware and/or software of a standalone server, a cloud-implemented server, a distributed server or as processing resources in a server farm. The host computer 150 may be under the ownership or control of a service provider, or may be operated by the service provider or on behalf of the service provider. The host computer 150 may communicate with the wireless device 131 via a fifth link 160. The fifth link 160 may comprise one or more wired and wireless links, and extend via, e.g., the cloud 170, and any of network nodes or core network nodes in the wireless communications network 100, e.g., any of the first network node 111, the second network node 112, and the third network node 113. In some examples, the fifth link 160 may extend via an optional intermediate network, which is not depicted in FIG. 3 to simplify the Figure. The intermediate network may be one of, or a combination of more than one of, a public, private or hosted network; the intermediate network may be a backbone network or the Internet. A connectivity provided by the fifth link 160 may be referred to as an Over the Top (OTT) connection.

The system comprising the host computer 150, and at least one of the network node 111 and the wireless device 130 may be referred to herein as a communications system 180.

In general, the usage herein of "first", "second", "third", "fourth", and/or "fifth" may be understood to be an arbitrary way to denote different elements, and may be understood to not confer a cumulative or chronological character to the elements they modify.

Several embodiments are comprised herein. Components from one embodiment may be tacitly assumed to be present in another embodiment and it will be obvious to a person skilled in the art how those components may be used in the other exemplary embodiments.

More specifically, the following are: a) embodiments related to a first network node, such as the first network node 111; b) embodiments related to a wireless device, such as the wireless device 130, e.g., a UE; c) embodiments related to a second network node, such as the second network node 112, and d) embodiments related to a communications system, such as the communications system 180.

Embodiments of a method performed by the first network node 111, will now be described with reference to the flowchart depicted in FIG. 4. The method may be understood to be for handling broadcast information. The network node 111 operates in the wireless communications network 100.

In some embodiments, all the actions may be performed. In some embodiments, one or more actions may be performed. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples. In FIG. 4, optional actions are indicated with dashed lines. Some actions may be performed in a different order than that shown in FIG. 4.

Action 401

In the course of communications within the wireless communications network 100, the first network node 111, in this Action 401, may obtain, from the wireless device 131, a positioning request. A positioning request may be understood as an indication to the first network node 111 that a certain wireless device, here the wireless device 131, requires a positioning estimation and, hence, that the wireless device needs to obtain assistance information from the first network node 111. In the specific case of GNSS assistance data, the specific request may concern the different satellite systems, atmospheric corrections in the ionosphere and/or troposphere, ephemeris, clock corrections and almanac, reference time and position, the type of corrections such as differential GNSS relating to GNSS code phase measurement, RTK corrections relating to GNSS carrier phase measurements, precise point positioning (PPP) corrections relating to detailed satellite orbit trajectories and clock offsets, etc In the specific case of OTDOA or UTDOA assistance data, the specific request may concern information about the positioning reference signals, coordinates of the base stations or transmission points, network synchronization information, etc.

The obtaining in this Action 401 may be implemented, e.g., via the first link 141, and the second link 142.

Action 402

There may be a plurality of types of subscription for the wireless devices 131, 132, 133 in the wireless communications network 100, e.g., gold, silver, bronze. Each type of subscription may be understood to enable access to one or more types of service and/or one or more set of assistance information and/or one or more types of priorities within the wireless communications network 100. The access may be enabled by providing each wireless device with one or more authorizations based on the enabled one or more types of service and/or priorities. The wireless device 131 may have at least one type of subscription from the plurality of types of subscription. An authorization may be understood as a permission to access a certain one or more of: the one or more types of service and/or the one or more sets of assistance information and/or the one or more types of priorities within the wireless communications network 100.

In this Action 402, the first network node 111 may determine one or more authorizations based on the one type of subscription of the wireless device 131.

Action 403

In the course of its operations in the wireless communications network 100, the first network node 111 may need to provide information to the wireless devices 131, 132, 133. For example, the first network node 111 may need to send information to the wireless device 131 in response to the received positioning request in Action 401. The information may be positioning information, such as e.g., positioning assistance information, for example, GNSS assistance data, OTDOA or UTDOA assistance data. As will be described later, the information may be provided to the wireless devices 131, 132, 133 by having the information broadcasted by the second network node 112 as for example, a positioning assistance information System Information Broadcast (SIB).

To enforce access control over the information that may be broadcasted, the information may be broadcasted encrypted, so that it may only be decrypted by those wireless devices 131, 132, 133 that may have the correct access rights. Since different wireless devices 131, 132, 133 may have access to different types of information based on their type or types of subscription, a part of the information may be encrypted using a specific key, and then the key may be provided only to the wireless devices 131, 132, 133 that may have a right to access it, based on their type or types of subscription.

In order to accomplish this, in this Action 403, the first network node 111, determines one or more decryption keys, e.g., K1, K2, K3, to be provided to the wireless device 131 operating in the wireless communications network 100. A decryption key may be understood herein as a ciphering key, that is a key that may be used by ciphering technology in general. In other words, a key that may be used for either encryption or decryption. In particular, in the case of symmetric key ciphering, the same key may be used for both encryption and decryption. K1, K2, K3 are used herein as illustrating examples to support the description of embodiments herein. Therefore the usage of any of K1, K2, K3 after any term herein may be understood to be for illustrative purposes only and non-limiting.

The determination in this Action 403 of the decryption keys K1, K2, K3 may be performed by generating new set of identifiable binary values with certain bit sizes. The bit size may be, e.g., 256 bits or 128 bits. Any of the decryption keys K1, K2, K3 may be for example, a broadcast encryption key in 3G, or a functionally similar key. That is, a group key that may be requested by a wireless device such as the wireless device 131 using the Mobile Originating Location Request, as described in 3GPP TS 23.171: "Functional stage 2 description of location services in UMTS".

The one or more decryption keys K1, K2, K3 enable the wireless device 131 to decrypt information to be broadcasted by the second network node 112 operating in the wireless communications network 100. The information comprises a plurality of subsets of positioning information. Each of the subsets of positioning information is to be, or is, encrypted, e.g., by the first network node 111, with a different encryption key, based on a respective type of subscription of a plurality of types of subscription for the wireless devices 131, 132, 133 in the wireless communications network 100. The determined one or more decryption keys K1, K2, K3 are based on at least one type of subscription of the wireless device 131 from the plurality of types of subscription.

Each of the subsets of the positioning information may for example be characterized by the positioning method, the level of detail or accuracy, the update rate etc. . . . Specific examples of the subsets will be provided later.

The information may be understood to then be broadcasted at a same time period, or as part of a same message.

In the embodiments wherein Action 401 may have been performed, the determining of the one or more decryption keys K1, K2, K3 in this Action 403 may be further based on the obtained positioning request. That is, the determining in this Action 403 may be triggered by receiving the positioning request.

The one or more decryption keys K1, K2, K3 may, for example, comprise one decryption key K1. In some embodiments, the one decryption key K1 may enable the wireless device 131 to derive other decryption keys, such as K2, K3. How this derivation, or calculation, may be performed will be described in relation to Action 502.

Each of the one decryption key K1 and the other decryption keys K2, K3 may enable the wireless device 131 to decode a different subset of the plurality of subsets of positioning information. To express some of the foregoing in other words, access to a content of each of the subsets of positioning information may be understood to be restricted to the plurality of wireless devices in the wireless communications network 100, based on type of subscription, which may be e.g., gold, silver, bronze, of each of the wireless devices in the plurality.

Accordingly, in the embodiments wherein Action 402 may have been performed, the determining 403 of the one or more decryption keys K1, K2, K3 in this Action 403 may be further based on the determined one or more authorizations. That is, based on the one or more authorizations the wireless device 131 may have based on its at least one type of subscription, the first network node 111 may determine to provide the wireless device 131 with one or more of the decryption keys, thereby enabling the wireless device 131 to gain access to the subset or subsets of the plurality of subsets of positioning information it may be authorized to access.

The determined one or more decryption keys may be provided to the wireless device 131 via a Mobility Management Entity.

Action 404

In this Action 404, the first network node 111 initiates providing the determined one or more decryption keys K1, K2, K3 to the wireless device 131.

To initiate providing may be understood as e.g., initiating sending. That is, to provide or send, or to trigger or enable another network node, e.g., the third network node 113, an MME, to provide or send. In such examples, the sending may be implemented via the third network node 113, e.g., via the third link 143, and the fourth link 144. This may be done for example in NAS message that may preferably be encrypted. In some examples, the determined one or more decryption keys K1, K2, K3 may be pre-distributed or provided to the wireless device 131 through a management protocol such as LPP.

In other examples, to initiate providing may be understood as to enable another network node such as the second network node 112, to provide or send. The sending may then be implemented, e.g., via the first link 141, and the second link 142. This may be done for example in an RRC message that may preferably be encrypted. They may also be distributed using RRC messages or other signaling.

There are a number of ways to deliver keys, such as K1, K2 and K3 discussed above, from the first network node 111 to the wireless device 131, and it may be understood that the confidentiality of the key may need to be ensured during the process. It may be assumed that the first network node 111, the third network node 113, and second network node 112 are located in trusted sites. Trusted sites may be assumed to not leak keys or other sensitive information to subscribers that the subscribers may not be able to have access to. Furthermore, trusted sites may be understood to be connected by confidentiality protected links. The confidentiality protection may be provided using encryption, physical protection or other means. Hop-by-hop confidentiality protection may be understood to be provided for the LPP and LPPa protocols as their messages traverse only confidentiality protected links. Alternatively, the LPP and/or LPPa protocols may be protected end to end between the third network node 113 and the wireless device 131 using for example the well-known Transport Layer Security (TLS) protocol.

The determined one or more decryption keys may be provided by the first network node 111 to the third network node 113 with one or more identifiers associated with one or more of the wireless devices 131, 132, 133 that may be able to have access to the one or more of the determined keys, e.g. using the Location Services Application Protocol (LCS-AP protocol). Once the third network node 113 may have the keys and identifiers, the third network node 113 may deliver one or more of the determined keys to the associated wireless devices 131, 132, 133 using an encrypted NAS message. The third network node 113 may alternatively deliver one or more of the determined keys and associated identifiers or derivatives of said identifiers to the second network node 112. The second network node 112 may in turn deliver one or more of the keys to the wireless device 131.

The connections between the third network node 113 and the wireless device 131, and between the second network node 112 may and the wireless device 131, respectively, may provide encrypted message delivery according to the well-known and standardized 3GPP LTE specifications (3GPP TS 33.401).

Action 405

In some embodiments, the first network node 111 may, in this Action 405, obtain at least a first part of the positioning information from the third network node 113 operating in the wireless communications network 100, or operating in another network. As mentioned earlier, the third network node 113 may be, for example, an RTK GNSS server or an MME.

The obtaining in this Action 405 may be implemented by receiving the information, e.g., via the third link 143.

Action 406

In this Action 406, the first network node 111 may process the obtained at least first part of the positioning information for broadcast by at least the second network node 112 operating in the wireless communications network 100. Processing may comprise preparing a container for each network node to broadcast information, for example by dividing the positioning information as different octet strings. A container may be understood as a data structure according to a communication protocol, for example a communication protocol between the first network node 111 and the second network node 112, such as LPPa. The way in which the first network node 111 may process the obtained at least first part of the positioning information in this Action 406 may then determine how the wireless device 131 may later process the broadcasted information. The data may be a) segmented in such a way that the wireless device 131 may later decode segments separately, e.g., in pseudo segmentation, or may be b) segmented such that all segments may need to be retrieved and combined before the data may be decoded, e.g., in octet string segmentation. If the segmentation takes place in the first network node 111, then i) each segment may be encrypted individually and therefore be decrypted individually. It may also be possible ii) to first encrypt all data before splitting it up in segments, which means that all segments may need to be retrieved and combined before the data may be decrypted.

Action 407

The first network node 111 may then, in this Action 407, encrypt the information to be broadcasted by the second network node 112, according to the determined one or more decryption keys K1, K2, K3.

For example, if the information is to be broadcasted in a SIB, the SIB itself may be encrypted using the existing LTE encryption functions, such as EEA1, EEA2 or EA3 in LTE. Other algorithm choices may be more suitable, for example, the well-known and standardized Advance Encryption Standard Galois/Counter Mode (AES-GCM) or Advance Encryption Standard Counter Mode (AES-CTR). In the latter case, the first network node 111 may transmit the encrypted data to the second network node 112, which may include it in the appropriate SIB for broadcasting.

It may be noted that keys described in the preceding paragraphs may be further processed by the first network node 111, and by the wireless device 131, before being used as encryption keys for position related data. An example of further processing is to derive an algorithm specific encryption key K-enc from the key K1, e.g., K enc:=KDF(K1, alg_name, . . . ), where alg_name may be a constant number or a constant string identifying the encryption algorithm that may later be used to encrypt and/or decrypt position related data.

The encryption procedure may be preferably transparent to the second network node 112 and it may be encrypted and decrypted at the first network node 111 and the wireless device 131, respectively.

Action 408

The first network node 111, in this Action 408, initiates sending, to at least the second network node 112, the encrypted information to be broadcasted.

To initiate sending may be understood as sending, or triggering or enabling another network node, e.g., the second network node 112 to perform the sending. The sending may be implemented, e.g., via the first link 141, and the second link 142. As stated earlier, the connections between the second network node 112 may and the wireless device 131 may provide encrypted message delivery according to the well-known and standardized 3GPP LTE specifications (3GPP TS 33.401).

Action 409

In this Action 409, the first network node 111 obtains a result of one or more positioning measurements from the wireless device 131. The one or more positioning measurements may be based on broadcasted information comprising the positioning information. The broadcasted information may be enabled to be decrypted according to the determined one or more decryption keys K1, K2, K3.

The obtaining in this Action 409 may be implemented, e.g., via the first link 141 and the second link 142.

Embodiments of a method performed by a wireless device 131, will now be described with reference to the flowchart depicted in FIG. 5. The method is for handling broadcast information. The wireless device 131 operates in the wireless communications network 100.

In some embodiments all the actions may be performed. In some embodiments, one or more actions may be performed. One or more embodiments may be combined, where applicable. It should be noted that the examples herein are not mutually exclusive. Components from one example may be tacitly assumed to be present in another example and it will be obvious to a person skilled in the art how those components may be used in the other examples. All possible combinations are not described to simplify the description. In FIG. 5, optional actions are indicated with dashed lines. Some actions may be performed in a different order than that shown in FIG. 5.

The detailed description of some of the following corresponds to the same references provided above, in relation to the actions described for the first network node 111, and will thus not be repeated here to simplify the description. For example, The information may be positioning information, such as e.g., positioning assistance information, for example, GNSS assistance data, OTDOA or UTDOA assistance data.

Action 501

The wireless device 131, in this Action 501, sends the positioning request to at least one of the first network node 111 and the second network node 112.

The sending in this Action 501 may be implemented, e.g., via the second link 142, to the second network node 112, and via the first link 141 and the second link 142, to the first network node 111.

Action 502

In this Action 502, the wireless device 131, obtains, from the first network node 111 operating in the wireless communications network 100, the one or more decryption keys K1, K2, K3 enabling the wireless device 131 to decrypt information to be broadcasted by the second network node 112 operating in the wireless communications network 100. The information comprises the plurality of subsets of positioning information. As described earlier, each of the subsets of positioning information is to be, or is, encrypted with a different encryption key based on the respective type of subscription of the plurality of types of subscription for the wireless devices 131, 132, 133 in the wireless communications network 100. The obtained one or more decryption keys K1, K2, K3 are based on at least the one type of subscription of the wireless device 131 from the plurality of types of subscription. Therefore, the wireless device 131 may either have the key for decrypting all the subsets of positioning information, or one or more keys, decrypting particular subsets of the positioning information, according to its subscription access authorities.

In some embodiments, the one or more decryption keys may be obtained from the first network node 111 via the Mobility Management Entity, that is, in some examples, the third network node 113.

Obtaining in this Action 502 may be understood as receiving and may also involve calculating, deriving, retrieving from a storage, determining, etc. . . . .

In some embodiments, the one or more decryption keys K1, K2, K3 may comprise one decryption key K1. The one decryption key K1 may enable the wireless device 131 to derive the other decryption keys, e.g., K2, K3. Each of the one decryption key K1 and the other decryption keys K2, K3 may enable the wireless device 131 to decode a different subset of the plurality of subsets of positioning information.

It may be understood that the wireless device 131 may be a wireless device or a wireless device in combination with an authentication module. Examples of authentication modules are Universal Integrated Circuit Card (UICC) and Universal Subscriber Identity Module (USIM). Key derivations may be performed completely in the wireless device 131, completely in the authentication module, or partially performed in the wireless device 131 and partially performed in the authentication module.

The decryption keys may be derived using a key derivation function (KDF), e.g., the well-known and standardized function HMAC-SHA256, or the KDF defined in 3GPP TS 33.401 or 3GPP TS 33.220. Any of the other decryption keys, e.g., K2, K3, may have a property that it may be computed as a function of the one decryption key K1 and parameters known to the wireless device 131, for example as K2:=KDF(K1, . . . ).

In the embodiments wherein Action 501 may have been performed, the obtaining in this Action 502 of the one or more decryption keys K1, K2, K3 may be based on the sent positioning request. For example, the wireless device 131 may receive the one or more decryption keys in response to having sent the positioning request.

The keys may be also subject to an expiration time, which means that the wireless device 131 may need to renew keys once they have expired. The key renewal procedure may be the same as the procedure used to retrieve the initial keys.

Action 503

In some embodiments, the wireless device 131 may, in this Action 503, monitor the information broadcasted by the second network node 112.

The monitoring in this Action 503 may be understood as listening, or receiving, and may be implemented, e.g., via the second link 142.

Action 504

In this Action 404, the wireless device 131 decodes the information, broadcasted by the second network node 112, based on the obtained one or more decryption keys K1, K2, K3. Decoding may be understood as decrypting.

Action 505

Once the wireless device 131 has decoded the broadcasted information, in this Action 505, the wireless device 131 may perform one or more operations based on the decoded broadcasted information.

In embodiments, the one or more operations may comprise at least one of: a) performing one or more positioning measurements, and b) sending a result of the one or more positioning measurements to the first network node 111.

The term measurement used herein may comprise any measurement based on receiving a radio signal or channel, e.g., power-based measurements such as received signal strength, e.g., RSRP or Channel State Information RSRP (CSI-RSRP) or quality measurements, e.g., RSRQ, RS-SINR, SINR, Es/Iot, SNR, cell identification, synchronization signals measurements, angle measurements such as Angle Of Arrival (AOA), timing measurements such as Rx-Tx, Round-Trip Time (RTT), Reference Signal Time Difference (RSTD), Time Of Arrival (TOA), Time Difference Of Arrival (TDOA), timing advance, throughput measurements, channel quality measurements such CSI, Channel Quality Indicator (CQI), Pre-coding Matrix Indicator (PMI). Measurements may also be differentiated by purpose, and may be performed for one or more purposes, e.g., for one or more of: Radio Resource Management (RRM), MDT, SON, positioning, timing control or timing advance, synchronization. In a non-limited example, embodiments herein may apply to any measurement such as described above.

The sending may be implemented, by sending the result of the one or more positioning measurements to the second network node 112 first, that is, via the second network node 112. Therefore, the sending may be implemented e.g., via the second link 142 and the first link 141.

Embodiments of a method performed by the second network node 112, will now be described with reference to the flowchart depicted in FIG. 6. The method is for broadcasting information. The second network node 112 operates in the wireless communications network 100.

The method may comprise one or more of the following actions. Several embodiments are comprised herein. In some embodiments all the actions may be performed. In some embodiments, one or more actions may be performed. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples. In FIG. 6, optional actions are indicated with dashed boxes.

The detailed description of some of the following corresponds to the same references provided above, in relation to the actions described for the first network node 111, and will thus not be repeated here to simplify the description. For example, the information may be positioning information, such as e.g., positioning assistance information, for example, GNSS assistance data, OTDOA or UTDOA assistance data.

Action 601

The second network node 112, in this Action 601, obtains, from the first network node 111 operating in the wireless communications network 100, the information to be broadcasted by the second network node 112 to the wireless device 131 operating in the wireless communications network 100. As described earlier, the information comprises the plurality of subsets of positioning information. Each of the subsets of positioning information is be, or is, encrypted with a different encryption key based on the respective type of subscription of the plurality of types of subscription for wireless devices 131, 132, 133 in the wireless communications network 100. Each of the encrypted subsets of positioning information is enabled to be decrypted with one or more decryption keys K1, K2, K3 based on at least one type of subscription of the wireless device 131 from the plurality of types of subscription.

The receiving in this Action 601 may be implemented, e.g., via the first link 141.

Action 602

Once the second network node 112 has obtained the information, the second network node 112, in this Action 602, broadcasts the obtained information. The obtained information may be for example broadcasted as a SIB, e.g., a positioning assistance information SIB.

The broadcasting in this Action 602 may be implemented, e.g., via the second link 142.

In some embodiments, the one or more decryption keys, such as K1, K2, K3, may comprise one decryption key K1. The one decryption key K1 may enable the wireless device 131 to derive other decryption keys, e.g., K2, K3. Each of the one decryption key, e.g., K1, and the other decryption keys, e.g., K2, K3, may enable the wireless device 131 to decode a different subset of the plurality of subsets of positioning information.

Further details of the embodiments herein will now be provided, based on particular examples, wherein the information is positioning assistance information broadcasted in a SIB. In the description below, any reference to a/the location server may be understood to refer to the first network node 111. Any reference to a/the network node, or a/the eNB may be understood to refer to the second network node 112. Any reference to a device, a/the target device, or a/the UE may be understood to refer to the wireless device 131. Similarly, any reference to UEs/the UEs or the subscribers may be understood to refer to the wireless devices 131, 132, 133.

The main purpose of encrypting the positioning assistance information SIB may be understood to be for access control, that is, so that only subscribers being authorized or permitted to access the data may be able to receive it. To enforce access control, the data may encrypted so that it may be only decrypted by those UEs that have the correct access rights. This may be achieved by providing the UEs with appropriate decryption keys. A part of the data may be encrypted using a specific key. The network, via the first network node 111, and the second network node 112 or the third network node 113, may provide the UEs that may be allowed to have access to that part of the data with the specific key.

The information in the SIB may be ordered in a hierarchical fashion so that some subscribers may be able to have access to all data, whereas others may only be allowed to have access to a subset of the data. Therefore, the set of UEs connected to the network may be understood to be partitioned. UEs belonging to a given partition may be assigned access rights to a subset S1 of the data, and obtain a key that may decrypt S1. UEs belonging to another partition may be assigned access rights to a subset S2 of S1 and obtain a key that may decrypt S2, but not all of S1.

The assistance data partitions, also referred to herein as subsets, may for example be characterized by the positioning method, the level of detail or accuracy, the update rate etc.

Some of the assistance data may be semi static, while other parts of the assistance data may be dynamic. Therefore, the UE may also request a certain update rate for the dynamic data.

In the specific case of GNSS assistance data, the specific request may concern the different satellite systems, atmospheric corrections in the ionosphere and/or troposphere, ephemeris, clock corrections and almanac, reference time and position, the type of corrections such as differential GNSS relating to GNSS code phase measurement, RTK corrections relating to GNSS carrier phase measurements, precise point positioning (PPP) corrections relating to detailed satellite orbit trajectories and clock offsets, etc In the specific case of OTDOA or UTDOA assistance data, the specific request may concern information about the positioning reference signals, coordinates of the base stations or transmission points, network synchronization information, etc.

When using the term UE, it may be understood that this may be a wireless device or a wireless device in combination with an authentication module. Examples of authentication modules are Universal Integrated Circuit Card (UICC) and Universal Subscriber Identity Module (USIM). Key derivations may be performed completely in the wireless device, completely in the authentication module, or partially performed in the wireless device and partially performed in the authentication module.

In one embodiment, the target device may either have the key for decrypting the whole data or one or more key decrypting parts of the data according to its subscription access authorities.

One example on how the keys and subscriptions may be used for decrypting the SIB is explained in the example below.

Example

In this example, it is assumed that there are three partitions to which a subscriber and its corresponding UE may belong: gold, silver and bronze subscribers. Gold-subscribers may be allowed to be able to obtain a certain set of data, that is, a certain subset or subsets of positioning information. Silver subscribers may be allowed to be able to obtain a subset of the data the gold-subscriber obtain, and bronze subscribers may be allowed to be able to obtain a subset of the data the silver-subscribers may obtain. Forming a key hierarchy and distributing the keys as follows may be understood to enforce the access control model described.

A UE associated with a gold subscriber obtains a key K1 from the network, as described in Action 502. The obtaining may be achieved by the network, e.g., the first network node 111, transmitting the key to the UE, e.g., via the second network node 112, or the third network node 113 as MME, as described in relation to Action 404. This may be done for example in an RRC message or a NAS message that preferably is encrypted. It may also be achieved by deriving K1 from a key, e.g., Kgold, shared between the network and the UE. The key Kgold may need to be accessible to all UEs associated with subscribers in the gold-subscriber partition. Kgold may be pre-distributed or provided to the UEs through a management protocol such as LPP. It may also be distributed using NAS or RRC messages or other signaling. If K1 is derived from a key Kgold, it may for example, be derived using a key derivation function (KDF), e.g., the well-known and standardized function HMAC-SHA256. K1 may hence be computed as K1:=KDF(Kgold, . . . ).

The following conventions may be used here and in the following for uses of KDF: the comma operator "," in a formula may mean separation of parameters, or concatenation, or any other binary operation. The notation " . . . " may be interpreted to mean zero or more input parameters. An example of a parameter in this case may be the fixed ASCII string "Gold". In general, examples of parameters may be constants or strings used to ensure different combinations of inputs in certain context. Other examples may include dynamic parameters, such as counters and timestamps. A concrete example of a KDF is the well-known and standardized function HMAC-SHA256, or the KDF defined in 3GPP TS 33.401 or 3GPP TS 33.220.

A UE associated with a silver subscriber may obtain, as described in Action 502, a key K2 from the network, e.g., the first network node 111, in a message. The message may belong to, e.g., the NAS protocol, the RRC protocol or the LPP protocol. The key K2 may have a the property that it may be computed as a function of K1 and parameters known to the UE, for example as K2:=KDF(K1, . . . ).

A UE associated with a bronze subscriber obtains a key K3 from the network in a message. The message may belong to, e.g., the NAS protocol, the RRC protocol or the LPP protocol. The key K3 has a the property that it can be computed as a function of K1 or K2 and parameters known to the UE, for example as K3:=KDF(K2, . . . ).

With the above setup, Gold subscribers may compute K2 and K3 from their own K1.

Silver subscribers may compute K3 from their own K2 but may not be able to get to K1, since KDF may be understood as being practically infeasible to invert.

Bronze subscribers may only have K3, and may not be able to get K1 or K2.

The SIB itself may be encrypted using the existing LTE encryption functions, such as EEA1, EEA2 or EA3 in LTE. If the information is encrypted already in the location server, as described in Action 407, other algorithm choices may be more suitable, for example, the well-known and standardized AES-GCM or AES-CTR. In the latter case the location server transmits the encrypted data to the eNB, which includes it in the appropriate SIB for broadcasting.

The encryption procedure is preferably transparent to the network node (i.e. base station) and it will be encrypted and decrypted at the location server and the target device respectively, as described in Action 407 and 504, respectively.

For the purpose of this document and in 3GPP specifications, the terms ciphering and encryption may be treated as synonymous.

There are a number of ways to deliver keys, such as K1, K2 and K3 discussed above, from the E-SMLC to the UE, and it is important that the confidentiality of the key is ensured during the process. With reference to a network architecture similar to that depicted FIG. 1, it may be assumed that the E-SMLC, MME and eNB are located in trusted sites. Trusted sites may be assumed to not leak keys or other sensitive information to subscribers that the subscribers may not be able to have access to. Furthermore, trusted sites may be understood to be connected by confidentiality protected links. The confidentiality protection may be provided using encryption, physical protection or other means.

The connections between the MME and the UE and between the eNB and the UE respectively can provide encrypted message delivery according to the well-known and standardized 3GPP LTE specifications (3GPP TS 33.401).

Even though the example architecture depicted in FIG. 1 indicates that the LPP and LPPa messages are sent directly from the E-SMCL to the UE, they may, in fact, be transported via the MME, and then the eNB, before they reach the UE. This implies that hop-by-hop confidentiality protection may be understood to be provided for the LPP and LPPa protocols as their messages traverse only confidentiality protected links. Alternatively, the LPP and/or LPPa protocols may be protected end to end between the E-SMLC and the UE using for example the TLS protocol.

Because of this, it is clear that keys, such as K1, K2 and K3 discussed above, may securely be transported from the E-SMLC to the UE using LPP or LPPa. Further, keys and one or more identifier associated with one or more UEs that may be able to have access to the one or more of the keys may be delivered by the E-SMLC to the MME, e.g. using the LCS-AP protocol. Once the MME has the keys and identifiers, the MME may deliver one or more keys to the associated UEs using an encrypted NAS message. The MME may alternatively deliver one or more keys and associated identifiers or derivatives of said identifiers to an eNB. The eNB may in turn deliver one or more of the keys to the associated UE.

It may be noted that keys described in the preceding paragraphs may be further processed by the UE and the E-SMLC before being used as encryption keys for position related data. An example of further processing is to derive an algorithm specific encryption key K-enc from the key K1, e.g., K enc:=KDF(K1, alg_name, . . . ), where alg_name is a constant number or a constant string identifying the encryption algorithm that may later be used to encrypt and/or decrypt position related data.

In one embodiment, the positioning broadcast information may contain different blocks for OTDOA, A-GNSS and RTK separately, also possibly separated by different satellite systems, different update rates, different parts of the information that adhere to relatively frequent and less frequent updates. The RTK data may also contain several different satellites data, therefore the authority access given to different UEs may correspond to a subset of these blocks or all of them.

The keys may be also subject to an expiration time, which means that the UE may need to renew keys once they have expired. The key renewal procedure may be the same as the procedure used to retrieve the initial keys.

Figure 7:
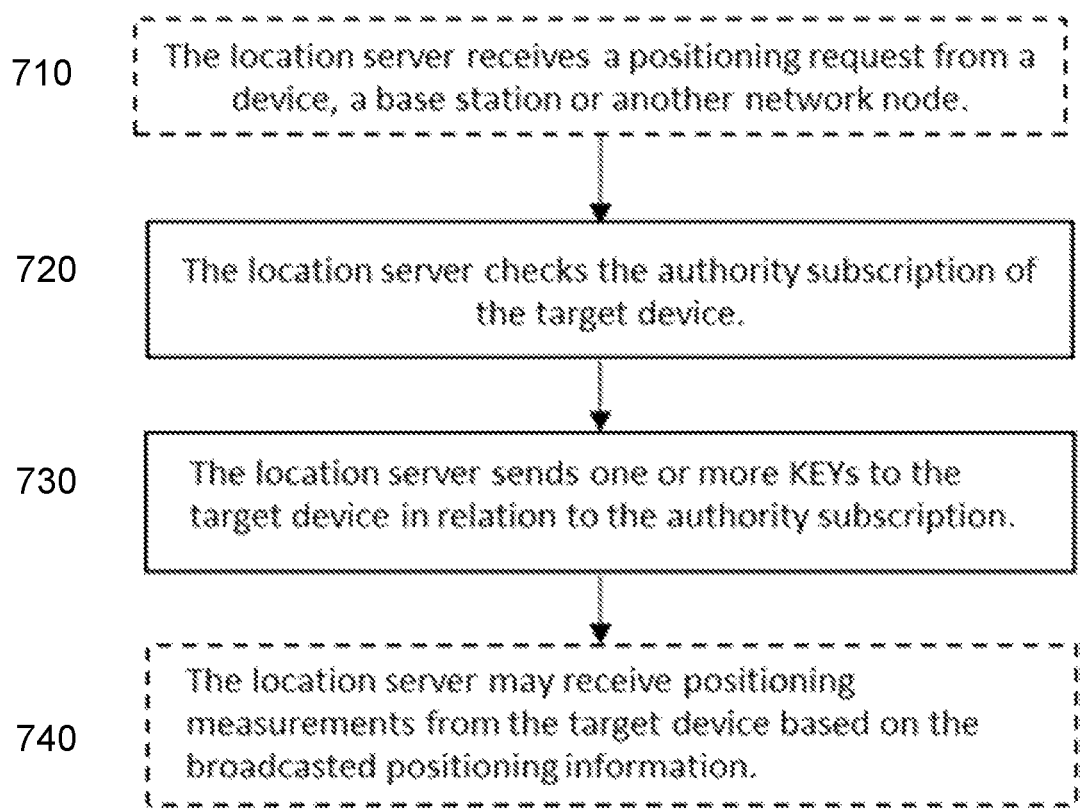
FIG. 7 is a flowchart depicting a non-limiting example of a method in a first network node, according to embodiments herein.

FIG. 7 is a flowchart depicting a non-limiting example of a method in the first network node 111, according to embodiments herein. As described in Action 401, at 710, the first network node 111, that is, the location server, may receive the positioning request from the wireless device 131, the second network node 112, e.g., a base station, or another network node, e.g., the third network node 113, which may be an MME. According to Action 402, the first network node 111, then checks, at 720, the authority subscription of the wireless device 131. At 730, the first network node 111, in agreement with Action 404, sends the one or more keys to the wireless device 131 in relation to the authority subscription of the wireless device 131. At 740, the first network node 111, may then receive positioning measurements from the wireless device 131 based on the broadcasted information, as described in Action 409. In relation to FIG. 7, the determining of Action 403 may be considered to be performed together with action 710, or together with action 720, although this is not indicated in FIG. 7.

Figure 8:
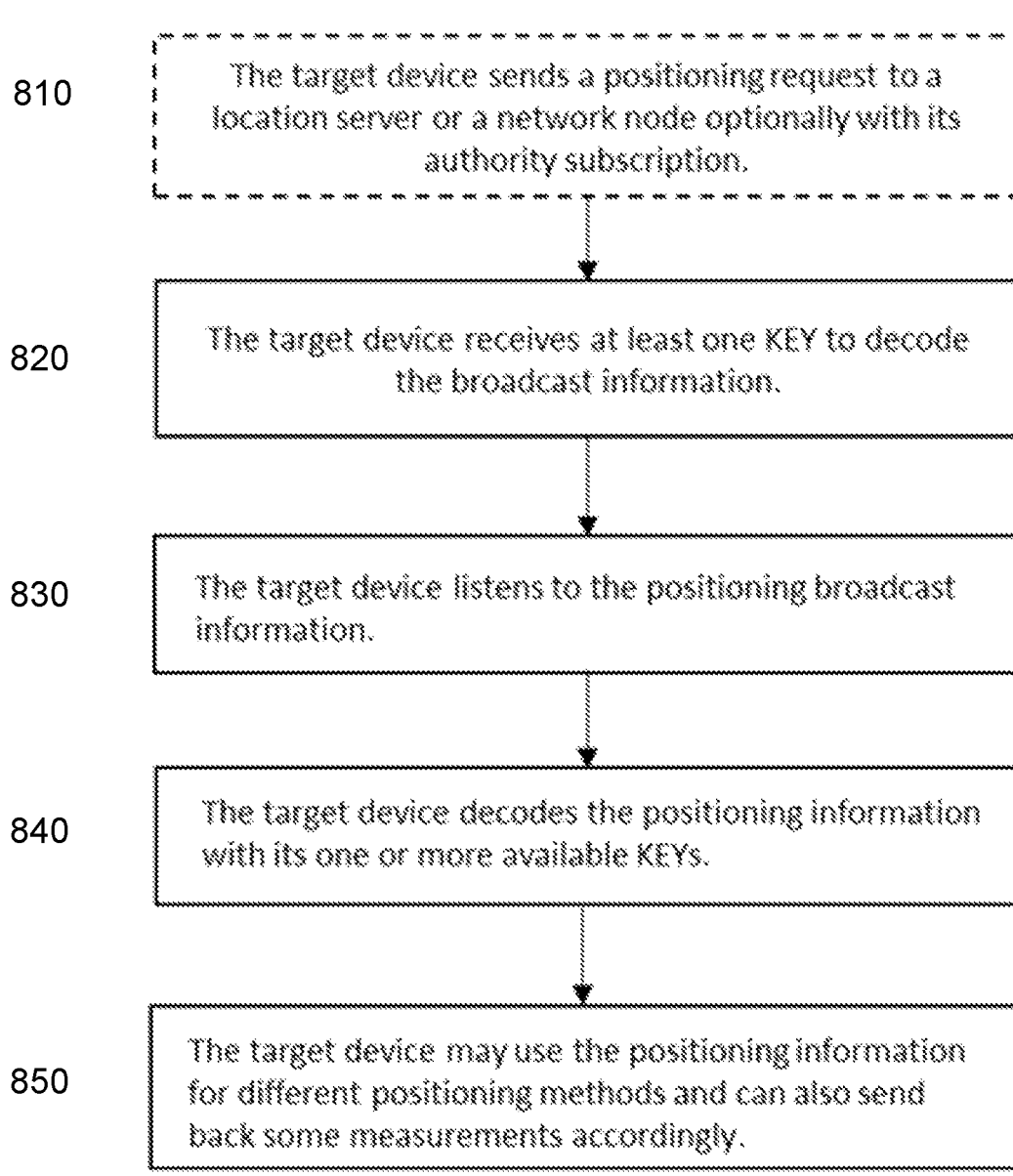
FIG. 8 is a flowchart depicting a non-limiting example of a method in a wireless device, according to embodiments herein.

FIG. 8 is a flowchart depicting a non-limiting example of a method in the wireless device 131, according to embodiments herein. As described in Action 501, at 810, the wireless device 131, that is, the target device, may send the positioning request to the first network node 111, or to another network node, e.g., the third network node 113 or the second network node 112, optionally, with its authority subscription. According to Action 502, the wireless device 131, then receives, at 820, at least one key to decode the broadcast information. At 830, the wireless device 131, in agreement with Action 503, listens to the positioning broadcast information. At 840, the wireless device 131, decodes the positioning information for different positioning methods, as described in Action 504, with the obtained at least one key. The wireless device 131 then at 850, uses the positioning information for different positioning methods, in agreement with Action 505, and may also send back some measurements accordingly.

FIG. 9 is a flowchart depicting a non-limiting example of a method in the second network node 112, according to embodiments herein. As described in Action 601, at 910, the second network node 112 receives the positioning information container from the first network node 111, that is, the location server. According to Action 602, the second network node 112 then broadcasts, at 920, the positioning information.

FIG. 10 is a flowchart depicting a non-limiting example of a method in a communications system, according to embodiments herein. As described in Action 401, at 1010, the first network node 111, the location server, receives positioning reference information from another unit in the wireless communications network 100, such as the third network node 133, e.g., an RTK network, in agreement with Action 405. The first network node 111 then, at 1020, prepares a positioning broadcast information container for each relevant network node, e.g., base station, in agreement with Action 406. According to Action 407, the first network node 111 encrypts part or all of the positioning broadcast information in each container. At 1040, the first network node 111 then sends the encrypted positioning broadcast information to each relevant network node, in agreement with Action 408.

According to the description provided above, particular embodiments herein may be understood to relate to a systematic procedure on how to cipher the positioning data which may need to be broadcasted. Particular embodiments herein may be understood to relate to encryption of positioning broadcast data. The encryption keys may be sent to the UEs separately in order to enable them to decode the encrypted positioning data which may be broadcasted. Embodiments herein may relate to a target device, a network node and a location server perspective. Particular embodiments herein may relate to OTDOA, Real Time Kinematics (RTK) GNSS, and the EPS Encryption Algorithm.

One or more advantages of embodiments herein may be summarized as follows. By encrypting the positioning broadcast data, it is possible to control the access of different UEs in using the broadcast data. Furthermore, it is possible to provide UEs with different positioning subscription advantages which empowers the network. Advantageously, the sensitive information from the network remains secure. Moreover, a more controllable use of the RTK GNSS network data is enabled.

Figure 11:
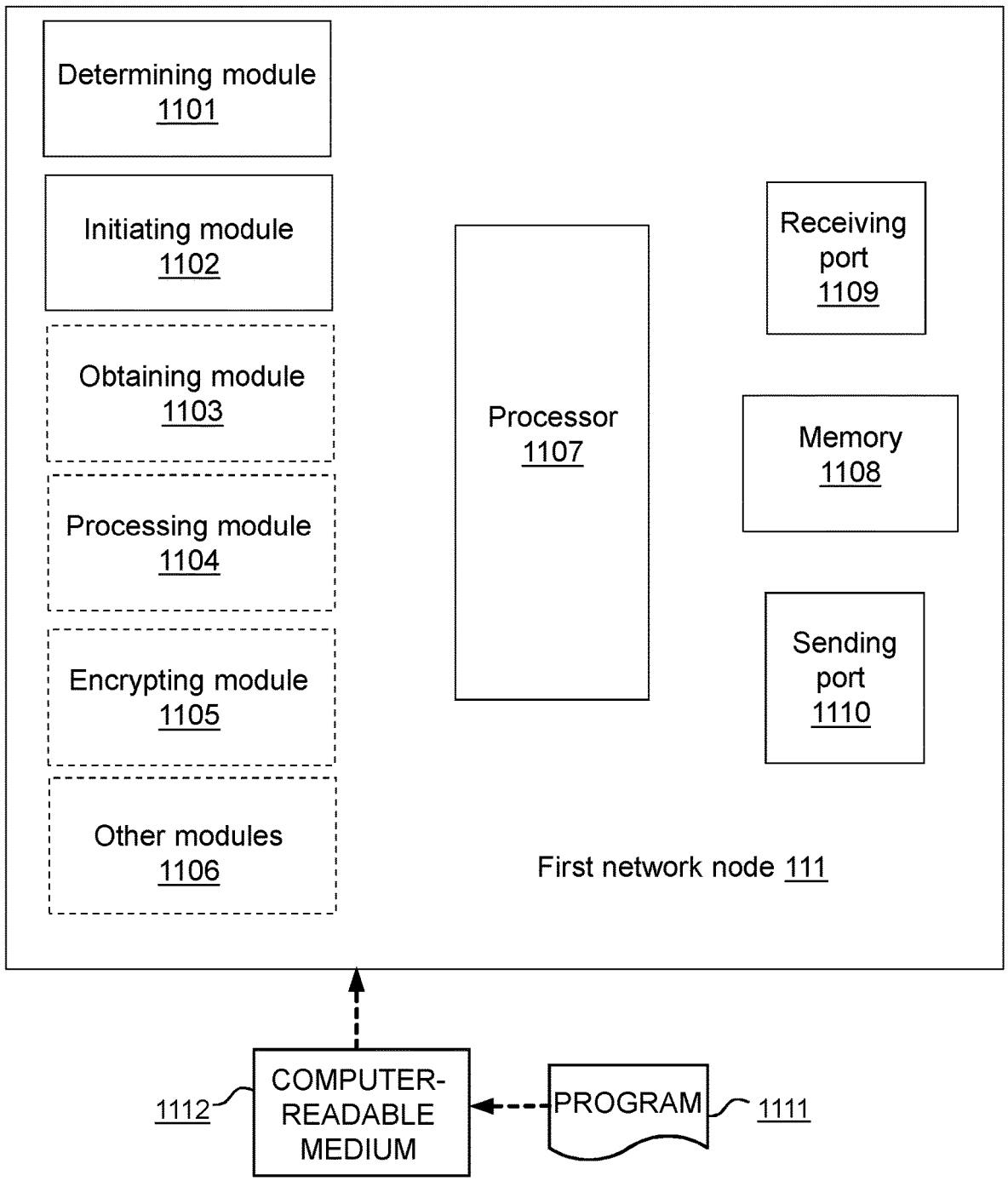
FIG. 11 is a schematic block diagram illustrating embodiments of a first network node, according to embodiments herein.

To perform the method actions described above in relation to FIG. 4, the first network node 111 may comprise the following arrangement depicted in FIG. 11. The first network node 111 is configured to operate in the wireless communications network 100.

The detailed description of some of the following corresponds to the same references provided above, in relation to the actions described for the first network node 111, and will thus not be repeated here.

In FIG. 11, optional modules are indicated with dashed boxes.

The first network node 111 is configured to, e.g. by means of a determining module 1101 within the first network node 111 configured to, determine the one or more decryption keys K1, K2, K3 configured to be provided to the wireless device 131. The wireless device 131 is configured to operate in the wireless communications network 100. The one or more decryption keys K1, K2, K3 are configured to enable the wireless device 131 to decrypt the information configured to be broadcasted by the second network node 112 configured to operate in the wireless communications network 100. The information is configured to comprise the plurality of subsets of positioning information. Each of the subsets of positioning information is configured to be encrypted with a different encryption key based on the respective type of subscription of the plurality of types of subscription for wireless devices 131, 132, 133 in the wireless communications network 100. The one or more decryption keys K1, K2, K3 configured to be determined are configured to be based on the at least one type of subscription of the wireless device 131 from the plurality of types of subscription. The determining module 1101 may be a processor 1107 of the first network node 111, or an application running on such processor.

The first network node 111 is configured to, e.g., by means of an initiating module 1102 within the first network node 111 configured to, initiate providing the one or more decryption keys configured to be determined, to the wireless device 131. The determining module 1102 may be the processor 1107 of the first network node 111, or an application running on such processor.

In some embodiments, the one or more decryption keys K1, K2, K3 may comprise one decryption key K1. The one decryption key K1 may be configured to enable the wireless device 131 to derive other decryption keys K2, K3. Each of the one decryption key K1 and the other decryption keys K2, K3 may be configured to enable the wireless device 131 to decode a different subset of the plurality of subsets of positioning information.

In some embodiments, the one or more decryption keys configured to be determined may be configured to be provided to the wireless device 131 via an MME.

The first network node 111 may be configured to, e.g. by means of an obtaining module 1103 within the first network node 111 configured to, obtain, from the wireless device 131, the positioning request. To determine the one or more decryption keys K1, K2, K3 may be further configured to be based on the positioning request configured to be obtained. The obtaining module 1103 may be the processor 1107 of the first network node 111, or an application running on such processor.

The first network node 111 may be configured to, e.g. by means of the determining module 1101 within the first network node 111 configured to, determine the one or more authorizations based on the one type of subscription of the wireless device 131. To determine the one or more decryption keys K1, K2, K3 may be further configured to be based on the one or more authorizations configured to be determined.

The first network node 111 may be configured to, e.g. by means of the obtaining module 1103 within the first network node 111 configured to, obtain the result of the one or more positioning measurements from the wireless device 131, the one or more positioning measurements being configured to be based on the broadcasted information comprising the positioning information. The broadcasted information may be configured to be enabled to be decrypted according to the one or more decryption keys K1, K2, K3 configured to be determined.

The first network node 111 may be configured to, e.g. by means of the obtaining module 1103 within the first network node 111 configured to, obtain at least the first part of the positioning information from the third network node 113 configured to operate in the wireless communications network 100, or configured to operate in another network.

The first network node 111 may be configured to, e.g. by means of a processing module 1104 within the first network node 111 configured to, process the at least first part of the positioning information configured to be obtained, for broadcast by at least the second network node 112 configured to operate in the wireless communications network 100. The processing module 1104 may be the processor 1107 of the first network node 111, or an application running on such processor.

The first network node 111 may be configured to, e.g. by means of an encrypting module 1105 within the first network node 111 configured to, encrypt the information configured to be broadcasted by the second network node 112, according to the one or more decryption keys K1, K2, K3 configured to be determined. The encrypting module 1105 may be the processor 1107 of the first network node 111, or an application running on such processor.

The first network node 111 may be configured to, e.g. by means of the initiating module 1102 within the first network node 111 configured to, initiate sending, to at least the second network node 112, the encrypted information configured to be broadcasted. The initiating module 1102 may be the processor 1107 of the first network node 111, or an application running on such processor.

Other modules 1106 may be comprised in the first network node 111.

The embodiments herein may be implemented through one or more processors, such as a processor 1107 in the first network node 111 depicted in FIG. 11, together with computer program code for performing the functions and actions of the embodiments herein. The program code mentioned above may also be provided as a computer program product, for instance in the form of a data carrier carrying computer program code for performing the embodiments herein when being loaded into the in the first network node 111. One such carrier may be in the form of a CD ROM disc. It is however feasible with other data carriers such as a memory stick. The computer program code may furthermore be provided as pure program code on a server and downloaded to the first network node 111.

The first network node 111 may further comprise a memory 1108 comprising one or more memory units. The memory 1108 is arranged to be used to store obtained information, store data, configurations, schedulings, and applications etc. to perform the methods herein when being executed in the first network node 111.

In some embodiments, the first network node 111 may receive information from the second network node 112, the third network node 113, the wireless device 131, the host computer 150, or any network node or device through a receiving port 1109. In some embodiments, the receiving port 1109 may be, for example, connected to one or more antennas in first network node 111. In other embodiments, the first network node 111 may receive information from another structure in the wireless communications network 100 through the receiving port 1109. Since the receiving port 1109 may be in communication with the processor 1107, the receiving port 1109 may then send the received information to the processor 1107. The receiving port 1109 may also be configured to receive other information.

The processor 1107 in the first network node 111 may be further configured to transmit or send information to e.g., second network node 112, the third network node 113, the wireless device 131, the host computer 150, or any network node or device, through a sending port 1110, which may be in communication with the processor 1107, and the memory 1108.

Those skilled in the art will also appreciate that the determining module 1101, the initiating module 1102, the obtaining module 1103, the processing module 1104, the encrypting module 1105, and the other modules 1106 described above may refer to a combination of analog and digital modules or units, and/or one or more processors configured with software and/or firmware, e.g., stored in memory, that, when executed by the one or more processors such as the processor 1107, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 1101-1106 described above may be implemented as one or more applications running on one or more processors such as the processor 1107.

Thus, the methods according to the embodiments described herein for the first network node 111 may be respectively implemented by means of a computer program 1111 product, comprising instructions, i.e., software code portions, which, when executed on at least one processor 1107, cause the at least one processor 1107 to carry out the actions described herein, as performed by the first network node 111. The computer program 1111 product may be stored on a computer-readable storage medium 1112. The computer-readable storage medium 1112, having stored thereon the computer program 1111, may comprise instructions which, when executed on at least one processor 1107, cause the at least one processor 1107 to carry out the actions described herein, as performed by the first network node 111. In some embodiments, the computer-readable storage medium 1112 may be a non-transitory computer-readable storage medium, such as a CD ROM disc, a memory stick, or stored in the cloud space. In other embodiments, the computer program 1111 product may be stored on a carrier containing the computer program, wherein the carrier is one of an electronic signal, optical signal, radio signal, or the computer-readable storage medium 1112, as described above.

The first network node 111 may comprise an interface unit to facilitate communications between the first network node 111 and other nodes or devices, e.g., the second network node 112, the third network node 103, the wireless device 131, the second wireless device 132, the third wireless device 103, the host computer 150, or any of other nodes or devices. In some particular examples, the interface may, for example, include a transceiver configured to transmit and receive radio signals over an air interface in accordance with a suitable standard.

Figure 12:
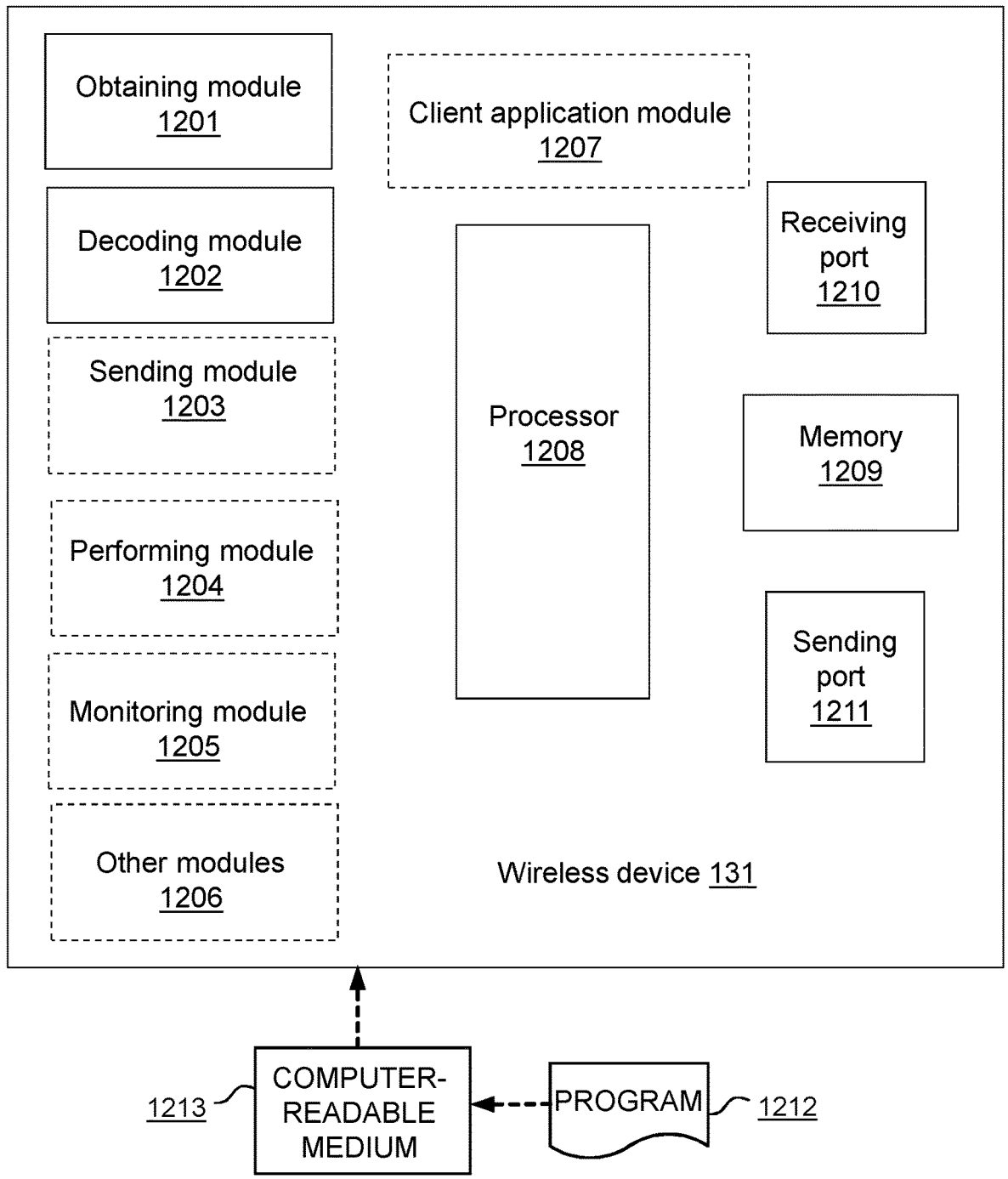
FIG. 12 is a schematic block diagram illustrating embodiments of a wireless device, according to embodiments herein.

To perform the method actions described above in relation to FIG. 5, the wireless device 131 may comprise the following arrangement depicted in FIG. 12. The wireless device 131 is configured to handle broadcast information. The wireless device 131 is configured to operate in the wireless communications network 100.

The detailed description of some of the following corresponds to the same references provided above, in relation to the actions described for the wireless device 131 and will thus not be repeated here.

In FIG. 12, optional modules are indicated with dashed boxes.

The wireless device 131 is configured to, e.g. by means of an obtaining module 1201 within the wireless device 131 configured to, obtain, from the first network node 111 configured to operate in the wireless communications network 100, the one or more decryption keys K1, K2, K3. The one or more decryption keys K1, K2, K3 are configured to enable the wireless device 131 to decrypt the information configured to be broadcasted by the second network node 112. The second network node 112 is configured to operate in the wireless communications network 100. The information is configured to comprise the plurality of subsets of positioning information. Each of the subsets of positioning information is configured to be encrypted with a different encryption key, based on the respective type of subscription of the plurality of types of subscription for the wireless devices 131, 132, 133 in the wireless communications network 100. The one or more decryption keys K1, K2, K3 configured to be obtained are configured to be based on the at least one type of subscription of the wireless device 131 from the plurality of types of subscription. The obtaining module 1201 may be a processor 1208 of the wireless device 131, or an application running on such processor.

The wireless device 131 may be configured to, e.g. by means of a decoding module 1202 within the wireless device 131 configured to, decode the information, configured to be broadcasted by the second network node 112, based on the one or more decryption keys K1, K2, K3 configured to be obtained. The decoding module 1202 may be the processor 1208 of the wireless device 131, or an application running on such processor.

In some embodiments, the one or more decryption keys, e.g., K1, K2, K3 may be configured to comprise one decryption key, e.g., K1. The one decryption key K1 may be configured to enable the wireless device 131 to derive the other decryption keys K2, K3. Each of the one decryption key K1 and the other decryption keys K2, K3 may be configured to enable the wireless device 131 to decode a different subset of the plurality of subsets of positioning information.

In some embodiments, the one or more decryption keys may be configured to be obtained from the first network node 111 via the MME.

The wireless device 131 may be configured to, e.g. by means of a sending module 1203 within the wireless device 131 configured to, send the positioning request to at least one of the first network node 111 and the second network node 112. In such embodiments, to obtain the one or more decryption keys K1, K2, K3 may be configured to be based on the positioning request configured to be sent. The sending module 1203 may be the processor 1208 of the wireless device 131, or an application running on such processor.

The wireless device 131 may be configured to perform, e.g. by means of a performing module 1204 within the wireless device 131 configured to, perform the one or more operations based on the broadcasted information configured to be decoded. The performing module 1204 may be the processor 1208 of the wireless device 131, or an application running on such processor.

In some embodiments, the one or more operations may be configured to comprise at least one of: a) performing the one or more positioning measurements, and b) sending the result of the one or more positioning measurements to the first network node 111.

The wireless device 131 may be configured to, e.g. by means of a monitoring module 1205 within the wireless device 131 configured to, monitor 503 the information configured to be broadcasted by the second network node 112. The monitoring module 1205 may be the processor 1208 of the wireless device 131, or an application running on such processor.

Other modules 1206 may be comprised in the wireless device 131.

The wireless device 131 may also comprise a client application module 1207, which may be configured to communicate user data with a host application module 1501 in the host computer 150, e.g., via the fifth link 160.

The embodiments herein may be implemented through one or more processors, such as a processor 1208 in the wireless device 131 depicted in FIG. 12, together with computer program code for performing the functions and actions of the embodiments herein. The program code mentioned above may also be provided as a computer program product, for instance in the form of a data carrier carrying computer program code for performing the embodiments herein when being loaded into the in the wireless device 131. One such carrier may be in the form of a CD ROM disc. It is however feasible with other data carriers such as a memory stick. The computer program code may furthermore be provided as pure program code on a server and downloaded to the wireless device 131.

The wireless device 131 may further comprise a memory 1209 comprising one or more memory units. The memory 1209 is arranged to be used to store obtained information, store data, configurations, schedulings, and applications etc. to perform the methods herein when being executed in the wireless device 131.

In some embodiments, the wireless device 131 may receive information from the first network node 111, the second network node 112, the third network node 113, the host computer 150, or any network node or device, through a receiving port 1210. In some embodiments, the receiving port 1210 may be, for example, connected to one or more antennas in wireless device 131. In other embodiments, the wireless device 131 may receive information from another structure in the wireless communications network 100 through the receiving port 1210. Since the receiving port 1210 may be in communication with the processor 1208, the receiving port 1210 may then send the received information to the processor 1208. The receiving port 1210 may also be configured to receive other information.

The processor 1208 in the wireless device 131 may be further configured to transmit or send information to e.g., the first network node 111, the second network node 112, the third network node 113, the host computer 150, or any network node or device, through a sending port 1211, which may be in communication with the processor 1208, and the memory 1209.

Those skilled in the art will also appreciate that the obtaining module 1201, the decoding module 1203, the sending module 1203, the performing module 1204, the monitoring module 1205, the other modules 1206, and the client application module 1207 described above may refer to a combination of analog and digital modules, and/or one or more processors configured with software and/or firmware, e.g., stored in memory, that, when executed by the one or more processors such as the processor 1208, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 1201-1207 described above may be implemented as one or more applications running on one or more processors such as the processor 1208.

Thus, the methods according to the embodiments described herein for the wireless device 131 may be respectively implemented by means of a computer program 1212 product, comprising instructions, i.e., software code portions, which, when executed on at least one processor 1208, cause the at least one processor 1208 to carry out the actions described herein, as performed by the wireless device 131. The computer program 1212 product may be stored on a computer-readable storage medium 1213. The computer-readable storage medium 1213, having stored thereon the computer program 1212, may comprise instructions which, when executed on at least one processor 1208, cause the at least one processor 1208 to carry out the actions described herein, as performed by the wireless device 131. In some embodiments, the computer-readable storage medium 1213 may be a non-transitory computer-readable storage medium, such as a CD ROM disc, a memory stick, or stored in the cloud space. In other embodiments, the computer program 1212 product may be stored on a carrier containing the computer program, wherein the carrier is one of an electronic signal, optical signal, radio signal, or the computer-readable storage medium 1213, as described above.

The wireless device 131 may comprise an interface unit to facilitate communications between the wireless device 131 and other nodes or devices, e.g., the network node 111, the second network node 112, the third network node 113, the host computer 150, or any other nodes or devices. In some particular examples, the interface may, for example, include a transceiver configured to transmit and receive radio signals over an air interface in accordance with a suitable standard.

Figure 13:
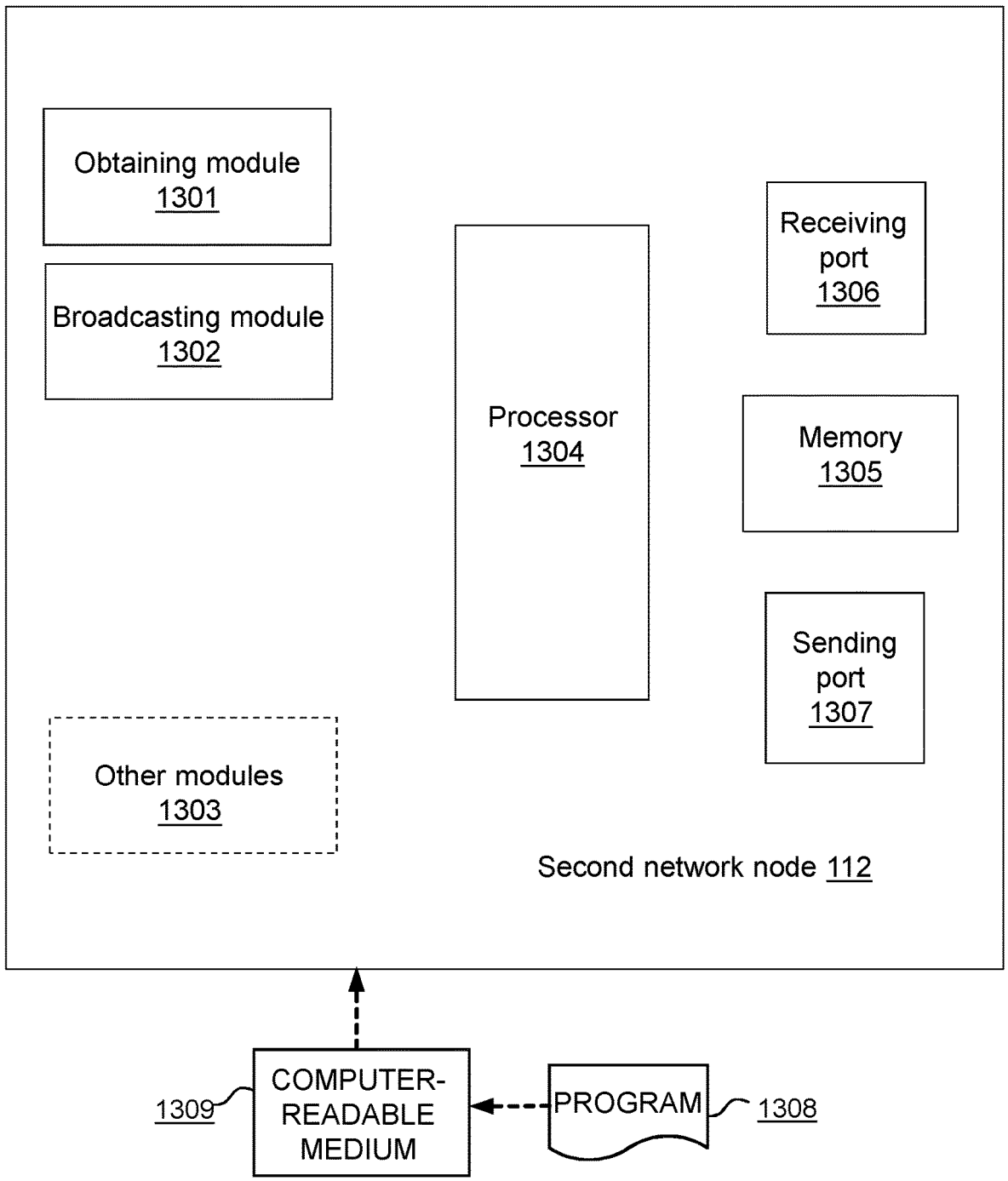
FIG. 13 is a schematic block diagram illustrating embodiments of a second network node, according to embodiments herein.

To perform the method actions described above in relation to FIG. 6, the second network node 112 may comprise the following arrangement depicted in FIG. 13. The second network node 112 is configured to operate in the wireless communications network 100.

The detailed description of some of the following corresponds to the same references provided above, in relation to the actions described for the second network node 112, and will thus not be repeated here.

In FIG. 13, an optional module is indicated with dashed boxes.

The second network node 112 may be configured to, e.g. by means of an obtaining module 1301 within the second network node 112 configured to, obtain, from the first network node 111 configured to operate in the wireless communications network 100, information configured to be broadcasted by the second network node 112 to the wireless device 131 configured to operate in the wireless communications network 100. The information is configured to comprise the plurality of subsets of positioning information. Each of the subsets of positioning information is configured to be encrypted with a different encryption key based on the respective type of subscription of the plurality of types of subscription for wireless devices 131, 132, 133 in the wireless communications network 100. Each of the encrypted subsets of positioning information, is configured to be enabled to be decrypted with the one or more decryption keys K1, K2, K3 based on at least one type of subscription of the wireless device 131 from the plurality of types of subscription. The obtaining module 1301 may be a processor 1304 of the second network node 112, or an application running on such processor.

The second network node 112 may be configured to, e.g. by means of a broadcasting module 1302 within the second network node 112 configured to, broadcast the information configured to be obtained. The broadcasting module 1302 may be the processor 1304 of the second network node 112, or an application running on such processor.

In some embodiments, the one or more decryption keys K1, K2, K3 may be configured to comprise one decryption key K1. The one decryption key K1 may be configured to enable the wireless device 131 to derive other decryption keys K2, K3. Each of the one decryption key K1 and the other decryption keys K2, K3 may be configured to enable the wireless device 131 to decode a different subset of the plurality of subsets of positioning information.

Other modules 1303 may be comprised in the second network node 112.

Figure 14:
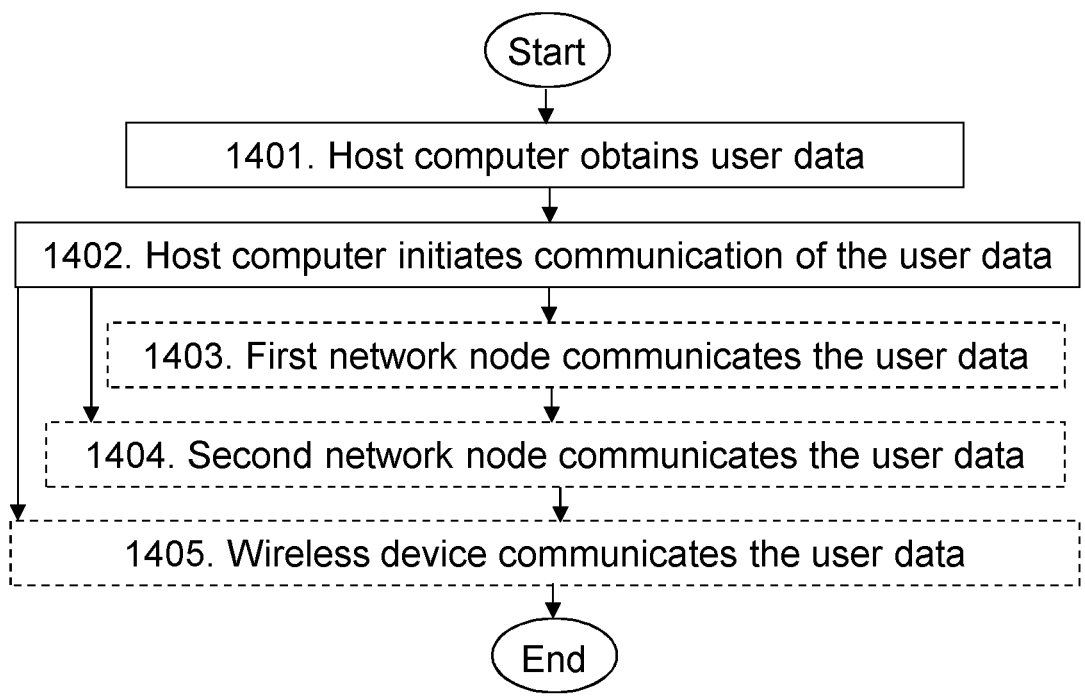
FIG. 14 is a flowchart depicting a method in a telecommunications system, according to embodiments herein.

The embodiments herein may be implemented through one or more processors, such as a processor 1304 in the second network node 112 depicted in FIG. 14, together with computer program code for performing the functions and actions of the embodiments herein. The program code mentioned above may also be provided as a computer program product, for instance in the form of a data carrier carrying computer program code for performing the embodiments herein when being loaded into the in the second network node 112. One such carrier may be in the form of a CD ROM disc. It is however feasible with other data carriers such as a memory stick. The computer program code may furthermore be provided as pure program code on a server and downloaded to the second network node 112.

The second network node 112 may further comprise a memory 1305 comprising one or more memory units. The memory 1305 is arranged to be used to store obtained information, store data, configurations, schedulings, and applications etc. to perform the methods herein when being executed in the second network node 112.

In some embodiments, the second network node 112 may receive information from the first network node 111, the third network node 113, the host computer 150, the wireless device 131, or any network node or device, through a receiving port 1306. In some embodiments, the receiving port 1306. In other embodiments, the second network node 112 may receive information from another structure in the wireless communications network 100 through the receiving port 1306. Since the receiving port 1306 may be in communication with the processor 1304, the receiving port 1306 may then send the received information to the processor 1304. The receiving port 1306 may also be configured to receive other information.

The processor 1304 in the second network node 112 may be further configured to transmit or send information to e.g., the first network node 111, the third network node 113, the host computer 150, the wireless device 131, or any network node or device, through a sending port 1307, which may be in communication with the processor 1304, and the memory 1305.

Those skilled in the art will also appreciate that the obtaining module 1301, the broadcasting module 1302, and the other modules 1303 described above may refer to a combination of analog and digital modules, and/or one or more processors configured with software and/or firmware, e.g., stored in memory, that, when executed by the one or more processors such as the processor 1304, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 1301-1302 described above may be implemented as one or more applications running on one or more processors such as the processor 1304.

Thus, the methods according to the embodiments described herein for the second network node 112 may be respectively implemented by means of a computer program 1308 product, comprising instructions, i.e., software code portions, which, when executed on at least one processor 1304, cause the at least one processor 1304 to carry out the actions described herein, as performed by the second network node 112. The computer program 1308 product may be stored on a computer-readable storage medium 1309. The computer-readable storage medium 1309, having stored thereon the computer program 1308, may comprise instructions which, when executed on at least one processor 1304, cause the at least one processor 1304 to carry out the actions described herein, as performed by the second network node 112. In some embodiments, the computer-readable storage medium 1309 may be a non-transitory computer-readable storage medium, such as a CD ROM disc, a memory stick, or stored in the cloud space. In other embodiments, the computer program 1308 product may be stored on a carrier containing the computer program, wherein the carrier is one of an electronic signal, optical signal, radio signal, or the computer-readable storage medium 1309, as described above.

The second network node 112 may comprise an interface unit to facilitate communications between the second network node 112, and or any of other nodes or devices, e.g., the first network node 111, the third network node 113, the wireless device 131, the host computer 150, or any of other nodes or devices. In some particular examples, the interface may, for example, include a transceiver configured to transmit and receive radio signals over an air interface in accordance with a suitable standard.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention.

Further Extensions and Variations

A method performed by the communications system 180 may comprise one or more of the following actions. The communications system 180 may comprise the first network node 111, the second network node 112, the wireless device 131 and the host computer 150.

In some embodiments all the actions may be performed. In some embodiments, one or more actions may be performed. One or more embodiments may be combined, where applicable. Particularly, it may be understood that any of the Actions, features or embodiments described thus far may be combined with the actions of the method in the communications system 180 described below. All possible combinations are not described to simplify the description. In FIG. 14, optional actions are indicated with dashed lines. Some actions may be performed in a different order than that shown in FIG. 14. For example, since communication may be any of reception of transmission, the actions may be performed in the opposite order than that depicted in FIG. 14.

Action 1401

In this Action 1401, the communications system 180 may obtain, at the host computer 150, user data for a user of the wireless device 131.

Action 1402

In this Action 1402, the communications system 180 may initiate communication, at the host computer 150, of the user data to or from the wireless device 131.

Action 1403

In this Action 1402, the communications system 180 may communicate, at the first network node 111, the user data between the host computer 150 and the wireless device 131. The first network node 111 may further perform the Action 403 of determining the one or more decryption keys K1, K2, K3 to be provided to the wireless device 131 operating in the wireless communications network 100. The one or more decryption keys K1, K2, K3 may enable the wireless device 131 to decrypt the information to be broadcasted by the second network node 112 operating in the wireless communications network 100. The information may comprise the plurality of subsets of positioning information. Each of the subsets of positioning information may be to be, or may be encrypted, e.g., by the first network node 111, with a different encryption key based on the respective type of subscription of the plurality of types of subscription for wireless devices 131, 132, 133 in the wireless communications network 100. The determined one or more decryption keys K1, K2, K3 may be based on at least the one type of subscription of the wireless device 131 from the plurality of types of subscription. The first network node 111 may further perform the Action 404 of initiating providing, or sending, the determined one or more decryption keys to the wireless device 131.

Action 1404

In this Action 1404, the communications system 180 may communicate, at the second network node 112, the user data to or from the host computer 150. The second network node 112 may further perform the Action 601 of obtaining, from the first network node 111 operating in the wireless communications network 100, the information to be broadcasted by the second network node 112 to the wireless device 131 operating in the wireless communications network 100. The information may comprise the plurality of subsets of positioning information. Each of the subsets of positioning information may be to be, or may be encrypted with a different encryption key based on the respective type of subscription of the plurality of types of subscription for the wireless devices 131, 132, 133 in the wireless communications network 100. Each of the encrypted subsets of positioning information, may be enabled to be decrypted with the one or more decryption keys K1, K2, K3 based on at least the one type of subscription of the wireless device 131 from the plurality of types of subscription.

The second network node 112 may further perform the Action 602 broadcasting the obtained information.

Action 1405

In some embodiments, the communications system 180 may communicate, at the wireless device 131, the user data to or from the host computer 150. The wireless device 131 may further perform the Action 402 of obtaining, from the first network node 111 operating in the wireless communications network 100, the one or more decryption keys K1, K2, K3 enabling the wireless device 131 to decrypt the information to be broadcasted by the second network node 112 operating in the wireless communications network 100. The information comprises the plurality of subsets of positioning information. Each of the subsets of positioning information may be to be, or may be, encrypted with a different encryption key based on the respective type of subscription of the plurality of types of subscription for wireless devices 131, 132, 133 in the wireless communications network 100. The obtained one or more decryption keys K1, K2, K3 may be based on at least the one type of subscription of the wireless device 131 from the plurality of types of subscription.

The wireless device 131 may further perform the Action 404 of decoding the information, broadcasted by the second network node 112, based on the obtained one or more decryption keys K1, K2, K3.

The information may be understood to be broadcasted at a same time period, or as part of a same message.

In some embodiments, the one or more decryption keys K1, K2, K3 may comprise one decryption key K1, and the one decryption key K1 may enable the wireless device 131 to derive other decryption keys K2, K3, wherein each of the one decryption key K1 and the other decryption keys K2, K3 may enable the wireless device 131 to decode a different subset of the plurality of subsets of positioning information.

In some embodiments, the wireless device 131 may obtain the one or more decryption keys K1, K2, K3 from the first network node 111 operating in the wireless communications network 100.

As stated earlier, communicating may mean herein any of receiving or transmitting. Similarly, communication may be transmission or reception. It may be understood that if the host computer 150 initiates communication, wherein communication is transmission, the communicating 703 at the first network node 111 may comprise receiving from the host computer 150 and transmitting to the wireless device 131, and the communicating 705 at the wireless device 131 may comprise receiving. Likewise, it may be understood that if the host computer 150 initiates communication, wherein communication is reception, the communicating 703 at the first network node 111 may comprise receiving from the wireless device 131 and transmitting to the host computer 150, and the communicating 705 at the wireless device 131 may comprise transmitting.

To perform the method actions described above in relation to FIG. 14, the communications system 180 may be configured to handle the broadcast information. The communications system 180 may comprise the first network node 111, the second network node 112, the wireless device 131 and the host computer 150.

The communications system 180 may be configured to obtain, at the host computer 150, the user data for a user of the wireless device 131. The communications system 180 may be further configured to initiate communication, at the host computer 150, of the user data to or from the wireless device 131.

Figure 15:
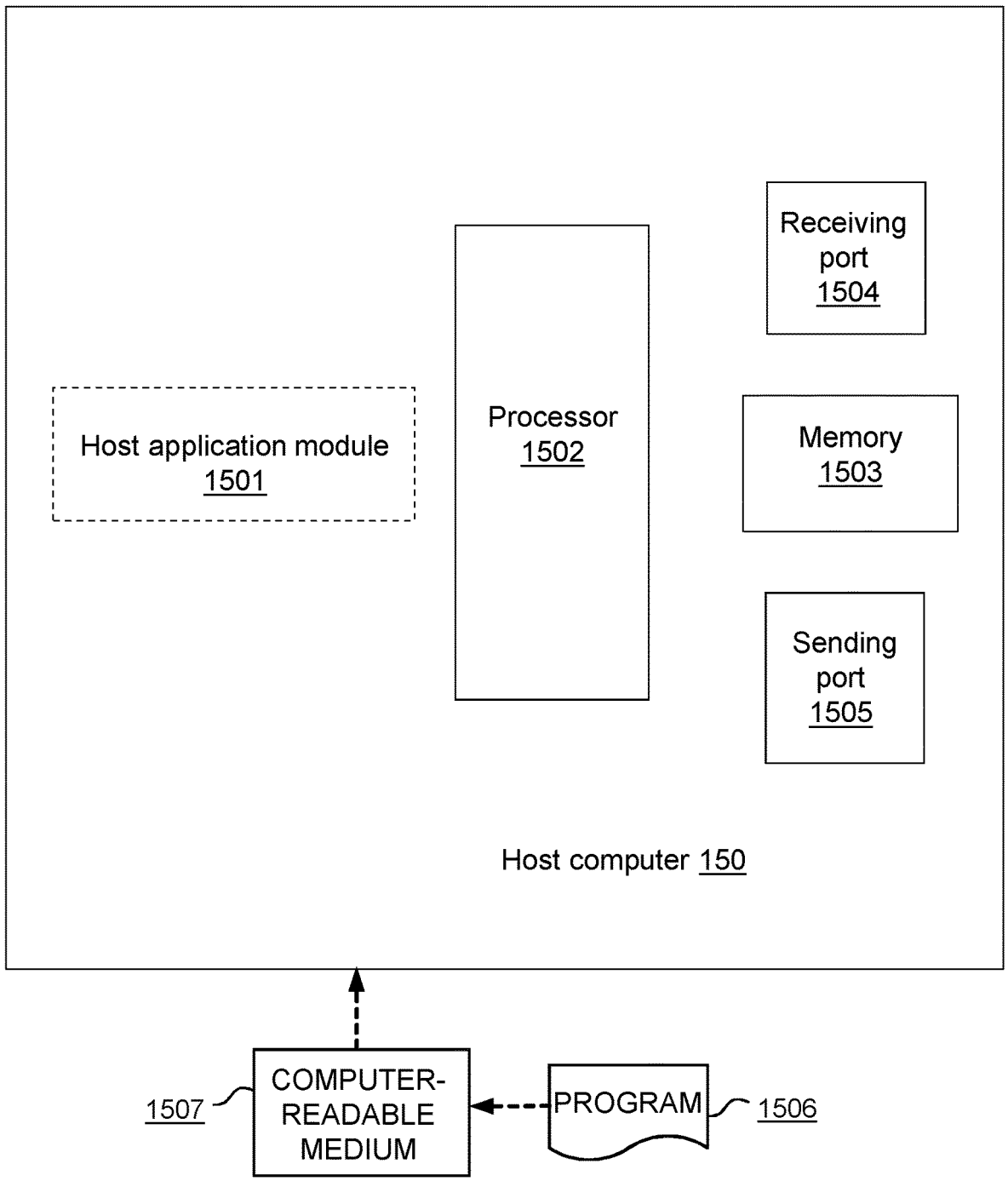
FIG. 15 is a schematic block diagram illustrating embodiments of a host computer, according to embodiments herein.

To perform the method actions described above in relation to FIG. 14, the host computer 150 may comprise the following arrangement depicted in FIG. 15.

The detailed description of some of the following corresponds to the same references provided above, in relation to the actions described for the first network node 111, the second network node 112, and the wireless device 131, and will thus not be repeated here.

The host computer 150 may be configured to, e.g. by means of a host application module 1501 within the host computer 150 configured, obtain, at the host computer 150, the user data for a user of the wireless device 131. The host application module 1501 may be a processor 1502 of the host computer 150, or an application running on such processor.

The host computer 150 may be configured to, e.g. by means of the host application module 1501 within the host computer 150 configured, initiate communication, at the host computer 150, of the user data to or from the wireless device 131.

The embodiments herein may be implemented through one or more processors, such as a processor 1502 in the host computer 150 depicted in FIG. 15, together with computer program code for performing the functions and actions of the embodiments herein. The program code mentioned above may also be provided as a computer program product, for instance in the form of a data carrier carrying computer program code for performing the embodiments herein when being loaded into the in the host computer 150. One such carrier may be in the form of a CD ROM disc. It is however feasible with other data carriers such as a memory stick. The computer program code may furthermore be provided as pure program code on a server and downloaded to the host computer 150.

The host computer 150 may further comprise a memory 1503 comprising one or more memory units. The memory 1503 is arranged to be used to store obtained information, store data, configurations, schedulings, and applications etc. to perform the methods herein when being executed in the host computer 150.

In some embodiments, the host computer 150 may receive information from, e.g., the first network node 111, the second network node 112, the third network node 113, the wireless device 131, or any network node or device, and/or another node in the wireless communications network 100 or another telecommunications network, such as an intermediate network, through a receiving port 1504. In some embodiments, the receiving port 1504 may be, for example, connected to one or more antennas in host computer 150. In other embodiments, the host computer 150 may receive information from another structure in the wireless communications network 100 through the receiving port 1504. Since the receiving port 1504 may be in communication with the processor 1502, the receiving port 1504 may then send the received information to the processor 1502. The receiving port 1504 may also be configured to receive other information.

The processor 1502 in the host computer 150 may be further configured to transmit or send information to e.g., the first network node 111, the second network node 112, the third network node 113, the wireless device 131, and/or another node in the wireless communications network 100 or another telecommunications network, such as an intermediate network, through a sending port 1505, which may be in communication with the processor 1502, and the memory 1503.

Those skilled in the art will also appreciate that the host application module 1201 described above may refer to a combination of analog and digital modules, and/or one or more processors configured with software and/or firmware, e.g., stored in memory, that, when executed by the one or more processors such as the processor 1502, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the host application module 1201 described above may be implemented as one or more applications running on one or more processors such as the processor 1502.

Thus, the methods according to the embodiments described herein for the host computer 150 may be respectively implemented by means of a computer program 1506 product, comprising instructions, i.e., software code portions, which, when executed on at least one processor 1502, cause the at least one processor 1502 to carry out the actions described herein, as performed by the host computer 150. The computer program 1506 product may be stored on a computer-readable storage medium 1507. The computer-readable storage medium 1507, having stored thereon the computer program 1506, may comprise instructions which, when executed on at least one processor 1502, cause the at least one processor 1502 to carry out the actions described herein, as performed by the host computer 150. In some embodiments, the computer-readable storage medium 1507 may be a non-transitory computer-readable storage medium, such as a CD ROM disc, a memory stick, or stored in the cloud space. In other embodiments, the computer program 1506 product may be stored on a carrier containing the computer program, wherein the carrier is one of an electronic signal, optical signal, radio signal, or the computer-readable storage medium 1507, as described above.

The host computer 150 may comprise an interface unit to facilitate communications between the host computer 150 and other nodes or devices, e.g., the first network node 111, the wireless device 131, the second network node 112, the third network node 113, or any of the other nodes or devices in the wireless communications network 100. In some particular examples, the interface may, for example, include a transceiver configured to transmit and receive radio signals over an air interface in accordance with a suitable standard.

The communications system 180 may be further configured to at least one of:

a) communicate, at the first network node 111, the user data between the host computer 150 and the wireless device 131, wherein the first network node 111 is further configured to: i) determine one or more decryption keys K1, K2, K3 to be provided to a wireless device 131 configured to operate in the wireless communications network 100, wherein the one or more decryption keys K1, K2, K3 may be configured to enable the wireless device 131 to decrypt information configured to be broadcasted by a second network node 112 configured to operate in the wireless communications network 100, the information being configured to comprise a plurality of subsets of positioning information, each of the subsets of positioning information being configured to be encrypted with a different encryption key based on a respective type of subscription of a plurality of types of subscription for wireless devices 131, 132, 133 configured to be in the wireless communications network 100, wherein the one or more decryption keys K1, K2, K3 configured to be determined are configured to be based on at least one type of subscription of the wireless device 131 from the plurality of types of subscription, and ii) Initiate providing the one or more decryption keys configured to be determined to the wireless device 131; and b) communicate, at the second network node 112, the user data to or from the host computer 150, wherein the second network node 112 is further configured to: iii) obtain, from a first network node 111 configured to operate in the wireless communications network 100, the information configured to be broadcasted by the second network node 112 to the wireless device 131 operating in the wireless communications network 100, the information being configured to comprise the plurality of subsets of positioning information, each of the subsets of positioning information being configured to be encrypted with a different encryption key based on the respective type of subscription of the plurality of types of subscription for wireless devices 131, 132, 133 in the wireless communications network 100, each of the encrypted subsets of positioning information, being configured to be enabled to be decrypted with one or more decryption keys K1, K2, K3 based on at least one type of subscription of the wireless device 131 from the plurality of types of subscription; and iv) broadcast the obtained information; and c) communicate, at the wireless device 131, the user data to or from the host computer 150, wherein the wireless device 131 is further configured to: v) obtain, from the first network node 111 configured to operate in the wireless communications network 100, the one or more decryption keys K1, K2, K3 configured to enable the wireless device 131 to decrypt the information configured to be broadcasted by the second network node 112 configured to operate in the wireless communications network 100, the information being configured to comprise the plurality of subsets of positioning information, each of the subsets of positioning information being configured to be encrypted with the different encryption key based on the respective type of subscription of the plurality of types of subscription for wireless devices 131, 132, 133 in the wireless communications network 100, wherein the one or more decryption keys K1, K2, K3 configured to be obtained are based on at least one type of subscription of the wireless device 131 from the plurality of types of subscription, and vi) decode the information, configured to be broadcasted by the second network node 112, based on the one or more decryption keys K1, K2, K3 configured to be obtained.

To perform the method actions described above in relation to FIG. 14, the network node 111 may be configured to perform the communicating Action 1403, e.g. by means of the other modules 1106 within the network node 111, configured to communicate, at the first network node 111, the user data between the host computer 150 and the wireless device 131.

The network node 111 may be configured to perform the other actions as described before. For example, the first network node 111 may be further configured to:

i) determine one or more decryption keys K1, K2, K3 to be provided to the wireless device 131 configured to operate in the wireless communications network 100, wherein the one or more decryption keys K1, K2, K3 may be configured to enable the wireless device 131 to the decrypt information configured to be broadcasted by the second network node 112 configured to operate in the wireless communications network 100; The information may be configured to comprise the plurality of subsets of positioning information; Each of the subsets of positioning information may be configured to be encrypted with the different encryption key based on the respective type of subscription of the plurality of types of subscription for the wireless devices 131, 132, 133 configured to be in the wireless communications network 100; The one or more decryption keys K1, K2, K3 configured to be determined may be configured to be based on at least the one type of subscription of the wireless device 131 from the plurality of types of subscription, and ii) initiate providing the one or more decryption keys configured to be determined to the wireless device 131.

Figure 4:
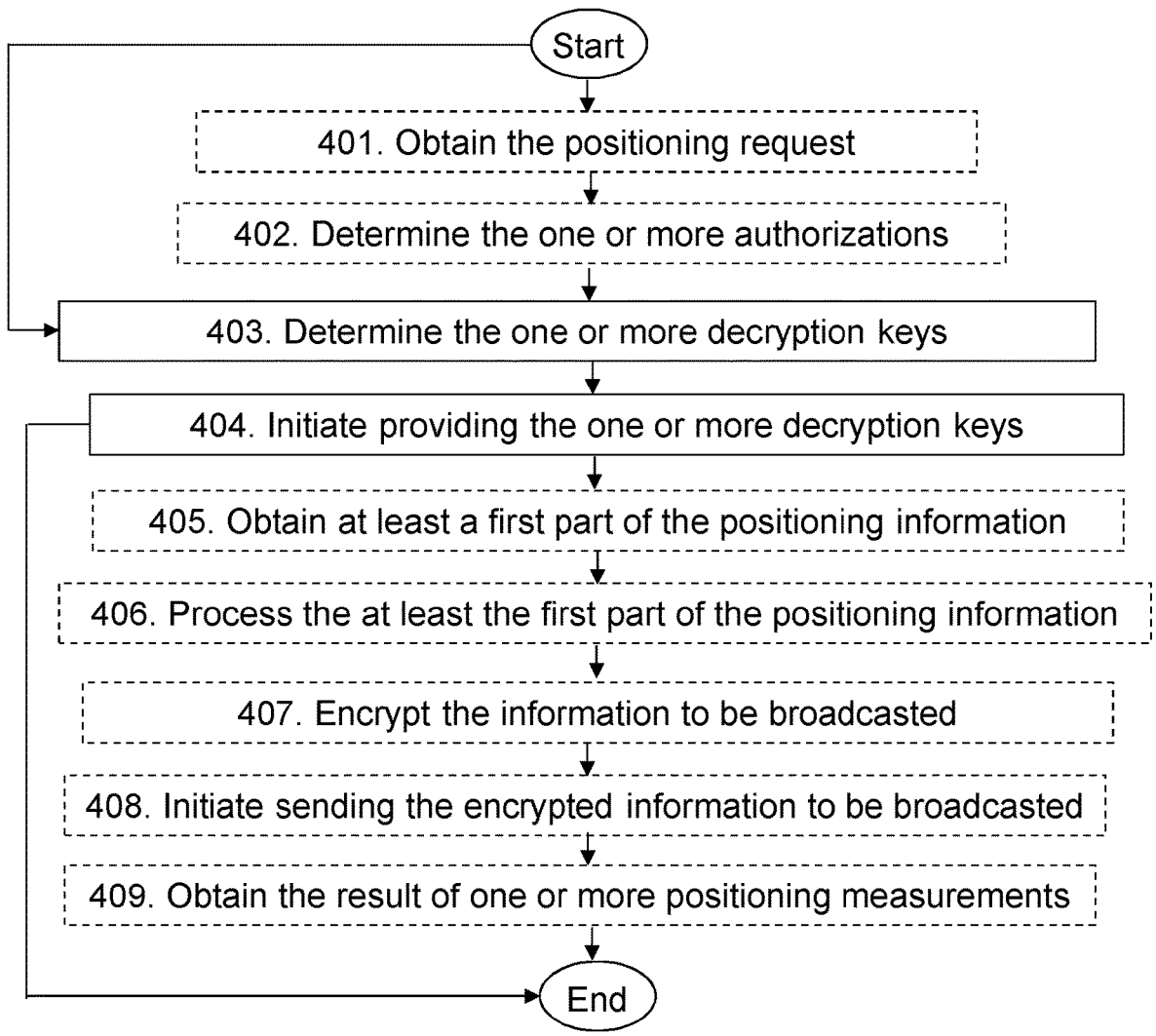
FIG. 4 is a flowchart depicting a method in a first network node, according to embodiments herein.

The first network node 111 may also be configured to perform any of the other actions described in relation to FIG. 4, as described before.

To perform the method actions described above in relation to FIG. 14, the second network node 112 may be configured to perform the communicating Action 1404, e.g. by means of other modules 1403 within the second network node 112, configured to communicate, at the second network node 112, the user data to or from the host computer 150.

The second network node 112 may be configured to perform the other actions as described before. For example, the second network node 112 may be further configured to:

iii) obtain, from a first network node 111 configured to operate in the wireless communications network 100, the information configured to be broadcasted by the second network node 112 to the wireless device 131 configured to operate in the wireless communications network 100; The information may be configured to comprise the plurality of subsets of positioning information; Each of the subsets of positioning information may be configured to be encrypted with a different encryption key based on the respective type of subscription of the plurality of types of subscription for wireless devices 131, 132, 133 in the wireless communications network 100; Each of the encrypted subsets of positioning information, may be configured to be enabled to be decrypted with the one or more decryption keys K1, K2, K3 based on at least one type of subscription of the wireless device 131 from the plurality of types of subscription; and iv) broadcast the information configured to be obtained.

Figure 6:
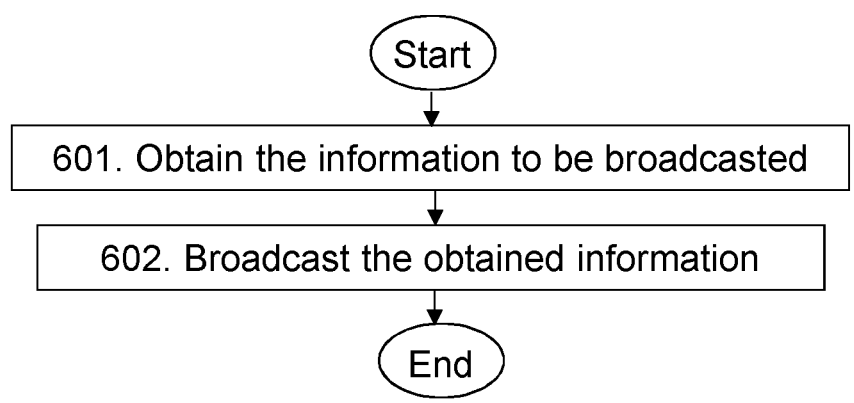
FIG. 6 is a flowchart depicting a method in a second network node, according to embodiments herein.

The second network node 112 may also be configured to perform any of the other actions described in relation to FIG. 6, as described before.

To perform the method actions described above in relation to FIG. 14, the wireless device 131 may be configured to perform the communicating action 1405, e.g. by means of the client application module 1307 within the wireless device 131, configured to communicate, at the wireless device 131, the user data to or from the host computer 150. The wireless device 131 may be configured to perform the other actions as described before. For example, the wireless device 131 may be further configured to:

v) obtain, from the first network node 111 configured to operate in the wireless communications network 100, the one or more decryption keys K1, K2, K3 configured to enable the wireless device 131 to decrypt the information configured to be broadcasted by the second network node 112; The second network node 112 is configured to operate in the wireless communications network 100; The information may be configured to comprise the plurality of subsets of positioning information; Each of the subsets of positioning information may be configured to be encrypted with the different encryption key, based on the respective type of subscription of the plurality of types of subscription for wireless devices 131, 132, 133 in the wireless communications network 100; The one or more decryption keys K1, K2, K3 configured to be obtained are configured to be based on at least the one type of subscription of the wireless device 131 from the plurality of types of subscription, and vi) decode the information, configured to be broadcasted by the second network node 112, based on the one or more decryption keys K1, K2, K3 configured to be obtained.

Figure 5:
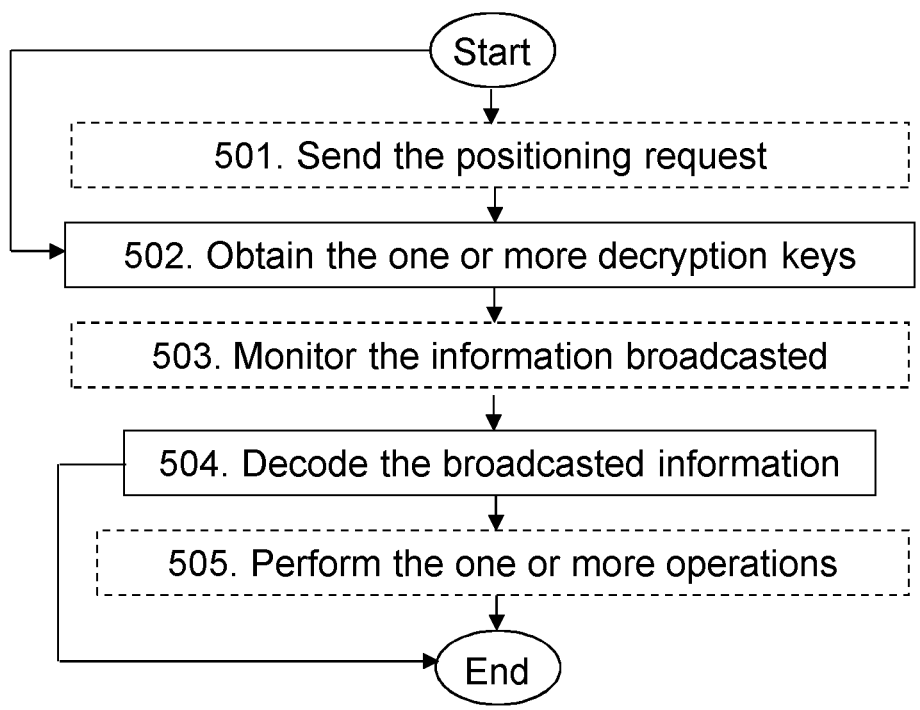
FIG. 5 is a flowchart depicting a method in a wireless device, according to embodiments herein.

The wireless device 131 may also be configured to perform any of the other actions described in relation to FIG. 5, as described before.

The invention claimed is:

1. A method, performed by a first network node, for handling broadcast information, the network node operating in a wireless communications network, the method comprising:

determining a first decryption key to be provided to a wireless device operating in the wireless communications network, the first decryption key enabling the wireless device to decrypt information according to an access model, the information to be obtained by the first network node and further broadcasted to the wireless device by a second network node operating in the wireless communications network, the information comprising a plurality of subsets of positioning information arranged in a hierarchical fashion such that subscribers have access to all or subsets of the positioning information depending on the type of subscription for wireless devices in the wireless communications network, each of the subsets of positioning information to be, or being, encrypted with a different encryption key hierarchy that enforces the access control model based on a respective type of subscription;

distributing decryption keys to be used by the wireless device to decrypt subsets of data according to said access control model by providing, to the wireless device, the first decryption key, which has properties that enables the wireless device to derive another decryption key as a function of the first decryption key, each of the decryption keys and enabling the wireless device to decrypt different subsets of the plurality of subsets of positioning information;

encrypting the information to be broadcasted by the second network node, according to the determined key; and initiating sending, to at least the second network node, encrypted information to be broadcasted to the wireless device.

2. The method according to claim 1, wherein the determined first decryption key is provided to the wireless device via a Mobility Management Entity.

3. The method according to claim 1, further comprising one or more of:

obtaining, from the wireless device, a positioning request, wherein the determining of the first decryption key is further based on the obtained positioning request; or determining one or more authorizations based on a type of subscription of the wireless device, wherein the determining of the first decryption key is further based on the determined one or more authorizations.

4. The method according to claim 1, the method further comprising any one or more of the following actions:

obtaining a result of one or more positioning measurements from the wireless device, the one or more positioning measurements being based on broadcasted information comprising the positioning information, the broadcasted information being enabled to be decrypted according to the determined first decryption key, obtaining at least a first part of the positioning information from a third network node operating in the wireless communications network or operating in another network, processing the obtained at least first part of the positioning information for broadcast by at least a second network node operating in the wireless communications network, encrypting the information to be broadcasted by the second network node according to the determined first decryption key, initiating sending, to at least the second network node, the encrypted information to be broadcasted.

5. A method, performed by a wireless device, for handling broadcast information, the wireless device operating in a wireless communications network, the method comprising:

obtaining, from a first network node operating in the wireless communications network, a first decryption key enabling the wireless device to decrypt information according to an access control model, the information to be obtained from the first network node and further broadcasted to the wireless device by a second network node operating in the wireless communications network, the information comprising a plurality of subsets of positioning information, the subsets of positioning information arranged in a hierarchical fashion so that subscribers have access to all or subsets of the positioning information depending on a type of subscription of a plurality of types of subscription for wireless devices in the wireless communications network, each of the subsets of positioning information to be, or being, encrypted with a different encryption key according to a key hierarchy that enforces the access control model based on the respective type of subscription;

deriving another decryption key as a function of the first decryption key, each of the first decryption key and the another decryption key enabling the wireless device to decrypt different subsets of the plurality of subsets of positioning information, and decrypting the information broadcasted by the second network node, by means of the first decryption key, and the another decryption key.

6. The method according to claim 5, wherein the first decryption key is obtained from the first network node via a Mobility Management Entity.

7. The method according to claim 5, wherein the method further comprises:

sending a positioning request to at least one of the first network node and the second network node, and wherein the obtaining of the first decryption key is based on the sent positioning request.

8. The method according to claim 5, the method further comprising performing one or more operations based on the broadcasted information, wherein the one or more operations comprise at least one of:

performing one or more positioning measurements, and sending a result of the one or more positioning measurements to the first network node.

9. A first network node configured to handle broadcast information, the network node being configured to operate in a wireless communications network, the first network node comprising:

a processor and a memory, the memory storing instructions executable by the processor whereby the first network node is configured to:

determine a first decryption key configured to be provided to a wireless device configured to operate in the wireless communications network, the first decryption key enabling the wireless device to decrypt information configured according to an access model, the information to be obtained by the first network node and further broadcasted to the wireless device by a second network node configured to operate in the wireless communications network, the information being configured to comprise a plurality of subsets of positioning information arranged in a hierarchical fashion such that subscribers have access to all or subsets of the positioning information depending on the type of subscription for wireless devices in the wireless communications network, each of the subsets of positioning information being configured to be encrypted with a different encryption key hierarchy that enforces the access control model based on a respective type of subscription;

distributing decryption keys to be used by the wireless device to decrypt subsets of data according to said access control model by providing, to the wireless device, the first decryption key, which has properties that enables the wireless device to derive another decryption key as a function of the first decryption key, each of the decryption keys and enabling the wireless device to decrypt different subsets of the plurality of subsets of positioning information;

encrypting the information to be broadcasted by the second network node, according to the determined key; and initiating sending, to at least the second network node, encrypted information to be broadcasted to the wireless device.

10. The first network node according to claim 9, wherein the first decryption key configured to be determined is configured to be provided to the wireless device via a Mobility Management Entity.

11. The first network node according to claim 9, the memory storing instructions executable by the processor whereby the first network node is configured to:
obtain, from the wireless device, a positioning request, wherein to determine the first decryption key is further configured to be based on the positioning request configured to be obtained; and/or
determine one or more authorizations based on a type of subscription of the wireless device, wherein to determine the first decryption key is further configured to be based on the one or more authorizations configured to be determined.

12. The first network node according to claim 9, the memory storing instructions executable by the processor whereby the first network node is configured to perform any one or more of the following actions:
obtain a result of one or more positioning measurements from the wireless device, the one or more positioning measurements being configured to be based on broadcasted information comprising the positioning information, the broadcasted information being configured to be enabled to be decrypted according to the first decryption key configured to be determined,
obtain at least a first part of the positioning information from a third network node configured to operate in the wireless communications network or configured to operate in another network,
process the at least first part of the positioning information configured to be obtained for broadcast by at least a second network node configured to operate in the wireless communications network,
encrypt the information configured to be broadcasted by the second network node according to the first decryption key configured to be determined,
initiate sending, to at least the second network node, the encrypted information configured to be broadcasted.

13. A wireless device configured to handle broadcast information, the wireless device being configured to operate in a wireless communications network, the wireless device comprising:
a processor and a memory, the memory storing instructions executable by the processor whereby the wireless device is configured to:
obtain, from a first network node configured to operate in the wireless communications network, a first decryption key configured to enable the wireless device to decrypt information configured according to an access control model, the information to be obtained from the first network node and further broadcasted to the wireless device by a second network node configured to operate in the wireless communications network, the information being configured to comprise a plurality of subsets of positioning information, the subsets of positioning information arranged in a hierarchical fashion so that subscribers have access to all or subsets of the positioning information depending on a type of subscription of a plurality of types of subscription for wireless devices in the wireless communications network, each of the subsets of positioning information being configured to be encrypted with a different encryption key according to a key hierarchy that enforces the access control model based on the respective type of subscription;
deriving another decryption key as a function of the first decryption key, each of the first decryption key and the another decryption key enabling the wireless device to decrypt different subsets of the plurality of subsets of positioning information, and
decrypting the information broadcasted by the second network node, by means of the first decryption key, and the another decryption key.

14. The wireless device according to claim 13, wherein the first decryption key is configured to be obtained from the first network node via a Mobility Management Entity.

15. The wireless device according to claim 13, the memory storing instructions executable by the processor whereby the wireless device is configured to:
send a positioning request to at least one of the first network node and the second network node, and wherein to obtain the first decryption key is configured to be based on the positioning request configured to be sent.

16. The wireless device according to claim 13, the memory storing instructions executable by the processor whereby the wireless device is configured to perform one or more operations based on the broadcast information, wherein the one or more operations comprise at least one of:
performing one or more positioning measurements, and
sending a result of the one or more positioning measurements to the first network node.

* * * * *